United States Patent [19]

Carlson et al.

[11] Patent Number: 4,478,958

[45] Date of Patent: * Oct. 23, 1984

[54] METHOD FOR PREPARING PHENOLIC FOAMS USING ANHYDROUS ARYL SULFONIC ACID CATALYSTS

[75] Inventors: John D. Carlson, Bradford Woods; Edward W. Kifer, Trafford; Vincent J. Wojtyna, Lyndora; James P. Colton, Monroeville, all of Pa.

[73] Assignee: Kopper Company, Inc., Pittsburgh, Pa.

[*] Notice: The portion of the term of this patent subsequent to Apr. 24, 2001 has been disclaimed.

[21] Appl. No.: 396,707

[22] Filed: Jul. 9, 1982

Related U.S. Application Data

[63] Continuation-in-part of Ser. No. 282,021, Jul. 10, 1981, abandoned.

[51] Int. Cl.³ ............................................. C08J 9/14
[52] U.S. Cl. ................................. 521/121; 521/131; 521/181; 521/910; 264/53; 264/DIG. 5
[58] Field of Search ............................... 521/121, 181

[56] References Cited

U.S. PATENT DOCUMENTS

| | | | |
|---|---|---|---|
| 2,446,429 | 8/1948 | Nelson et al. | 521/117 |
| 2,653,139 | 9/1953 | Sterling | 521/106 |
| 2,728,741 | 12/1955 | Simon et al. | 525/58 |
| 2,933,461 | 4/1960 | Mullen | 521/117 |
| 2,979,469 | 4/1961 | Shannon et al. | 521/116 |
| 3,271,331 | 9/1966 | Ender | 521/112 |
| 3,298,973 | 1/1967 | Quarles | 521/103 |
| 3,336,243 | 8/1967 | Garrett | 521/88 |
| 3,389,094 | 6/1968 | D'Alessandro | 521/114 |
| 3,389,095 | 6/1968 | Garrett | 521/53 |
| 3,484,391 | 12/1969 | Wheatley et al. | 521/181 |
| 3,639,303 | 2/1972 | Penfold | 521/181 |
| 3,640,911 | 2/1972 | Papa | 521/181 |
| 3,673,130 | 6/1972 | Papa | 521/107 |
| 3,692,706 | 9/1972 | Graham et al. | 521/106 |
| 3,694,387 | 9/1972 | Junger et al. | 521/103 |
| 3,726,708 | 4/1973 | Weissenfels et al. | 428/320.2 |
| 3,740,358 | 6/1973 | Christie et al. | 521/103 |
| 3,741,920 | 6/1973 | Weissenfels et al. | 521/116 |
| 3,821,337 | 6/1974 | Bunclark et al. | 264/26 |
| 3,830,894 | 8/1974 | Juenger et al. | 264/41 |
| 3,835,208 | 9/1974 | Koutitonsky | 264/45.5 |
| 3,842,020 | 10/1974 | Garrett | 521/54 |
| 3,862,912 | 1/1975 | Berndt et al. | 521/88 |
| 3,870,661 | 3/1975 | Crook et al. | 521/110 |
| 3,872,033 | 3/1975 | Boden et al. | 521/181 |
| 3,876,620 | 4/1975 | Moss | 528/155 |
| 3,877,967 | 4/1975 | Junger et al. | 428/318.4 |
| 3,885,010 | 5/1975 | Bruning et al. | 264/46.2 |
| 3,907,723 | 9/1975 | Pretot | 521/112 |
| 3,915,772 | 10/1975 | Weissenfels et al. | 156/79 |

(List continued on next page.)

FOREIGN PATENT DOCUMENTS

| | | |
|---|---|---|
| 674181 | 11/1963 | Canada . |
| 866876 | 3/1971 | Canada . |
| 1026068 | 2/1978 | Canada . |
| 1272857 | 5/1972 | United Kingdom . |
| 1275871 | 5/1972 | United Kingdom . |
| 1414506 | 11/1975 | United Kingdom . |
| 1488527 | 10/1977 | United Kingdom . |
| 1566109 | 4/1980 | United Kingdom . |

*Primary Examiner*—Morton Foelak
*Attorney, Agent, or Firm*—Herbert J. Zeh, Jr.

[57] ABSTRACT

The present invention is directed to a method of preparing a phenolic foam that has cell walls which are substantially free of perforations. The method comprises using certain anhydrous aryl sulfonic acids as the foaming and curing catalysts. The useful anhydrous aryl sulfonic acids are those which have a pKa of less than about 2.0 and which change the compatibility of the phenolic resole with water. The preferred anhydrous aryl sulfonic acid is a combination of toluene sulfonic acid and xylene sulfonic acid. The invention is also directed to a phenolic foam having cell walls which are substantially free of perforations and to foamable phenolic resole compositions for preparing the phenolic foam.

12 Claims, 34 Drawing Figures

U.S. PATENT DOCUMENTS

| | | | |
|---|---|---|---|
| 3,953,645 | 4/1976 | Moss | 428/304.4 |
| 3,968,300 | 7/1976 | Moss et al. | 428/304.4 |
| 3,998,765 | 12/1976 | Novak et al. | 521/121 |
| 3,999,230 | 12/1976 | Bruning et al. | 425/149 |
| 4,001,148 | 1/1977 | Simic et al. | 521/106 |
| 4,018,725 | 4/1977 | Hadley | 521/131 |
| 4,033,909 | 7/1977 | Papa | 521/131 |
| 4,033,910 | 7/1977 | Papa | 521/131 |
| 4,036,793 | 7/1977 | Mos | 521/110 |
| 4,042,314 | 8/1977 | Bruning et al. | 425/89 |
| 4,048,145 | 9/1977 | Moss | 528/155 |
| 4,067,829 | 1/1978 | Garrett | 521/91 |
| 4,070,313 | 1/1978 | Papa | 521/110 |
| 4,102,832 | 7/1978 | Weissenfels et al. | 521/103 |
| 4,107,107 | 8/1978 | Mendelsohn et al. | 521/106 |
| 4,111,911 | 9/1978 | Weissenfels et al. | 524/405 |
| 4,119,584 | 10/1978 | Papa et al. | 521/127 |
| 4,122,045 | 10/1978 | Garrett et al. | 521/103 |
| 4,133,931 | 1/1979 | Beale et al. | 428/305.5 |
| 4,140,842 | 2/1979 | Beale et al. | 521/129 |
| 4,165,413 | 8/1979 | Sefton et al. | 521/128 |
| 4,166,162 | 8/1979 | Weissenfels et al. | 521/100 |
| 4,176,106 | 11/1979 | Reid et al. | 524/843 |
| 4,176,216 | 11/1979 | Reid et al. | 521/106 |
| 4,202,945 | 5/1980 | Leinhardt | 521/121 |
| 4,204,020 | 5/1980 | Beale et al. | 428/314.8 |
| 4,205,135 | 5/1980 | Beale et al. | 521/116 |
| 4,207,400 | 6/1980 | Dahms | 521/112 |
| 4,207,401 | 6/1980 | Dahms | 521/112 |
| 4,216,295 | 8/1980 | Dahms | 521/112 |
| 4,219,623 | 8/1980 | Sudan et al. | 521/85 |
| 4,225,679 | 9/1980 | Pilato | 71/68 |
| 4,252,908 | 2/1981 | Paladini | 521/117 |
| 4,272,403 | 6/1981 | Meyer et al. | 502/168 |
| 4,303,758 | 12/1981 | Gussmer | 521/121 |
| 4,323,667 | 4/1982 | Meyer et al. | 528/138 |
| 4,332,754 | 6/1982 | Meunier et al. | 264/45.5 |

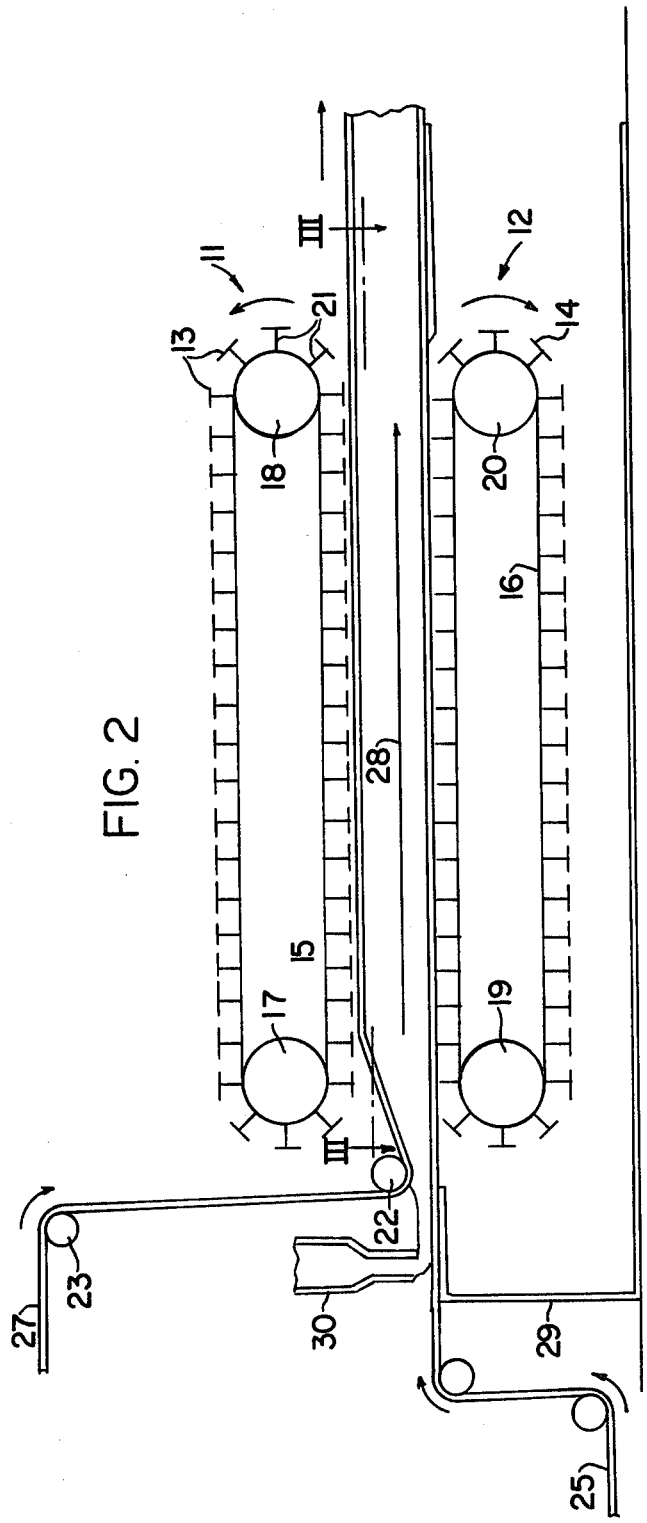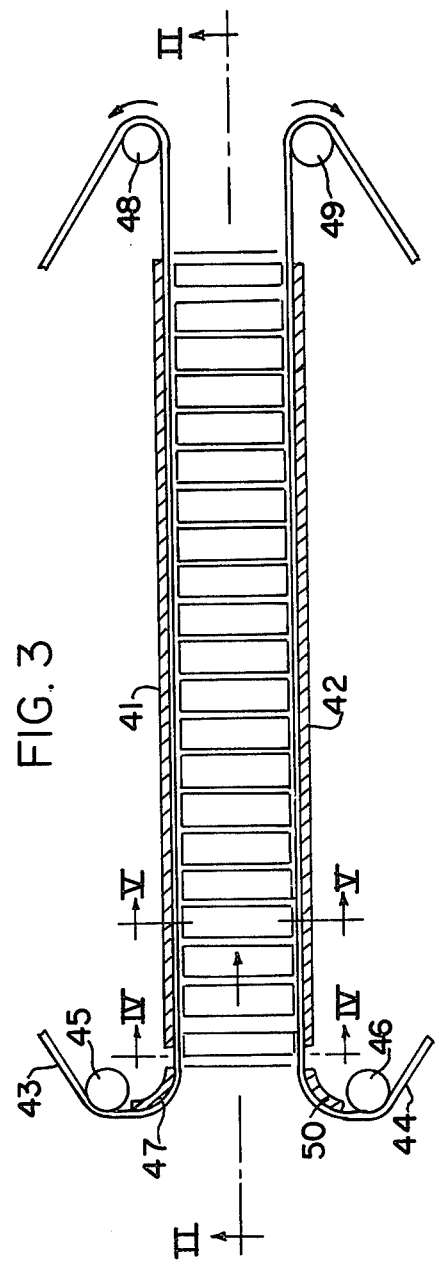

METHOD FOR PREPARING PHENOLIC FOAMS USING ANHYDROUS ARYL SULFONIC ACID CATALYSTS

CROSS-REFERENCE TO RELATED APPLICATIONS

This application is a continuation-in-part of U.S. application Ser. No. 282,021, filed July 10, 1981, now abandoned.

BACKGROUND OF THE INVENTION

1. Field of the Invention

This invention is directed to a composition and method for preparing phenolic foams having improved thermal insulation properties. The composition and method are especially useful in preparing phenolic foam having cell walls which are substantially free of perforations. The invention is also directed to phenolic foams prepared using the composition and method.

2. Prior Art

Phenolic foams prepared from phenol formaldehyde resoles have been known for many years. It is generally agreed that phenolic foams have the best fire rating of any known foam insulation. Phenolic foams do not burn even when contacted by the flame of a blow torch and give off minimal amounts of toxic gases. Phenolic foams can stand temperatures of 375° F. without serious degradation. Phenolic foams have an ASTM E-84 Steiner Tunnel Flame Spread rating of about 5, a Fuel Contribution of about 0 and a Smoke Rating of about 5.

Despite these advantages and generally favorable economics, phenolic foams have not heretofore penetrated the thermal insulation market. One of the main reasons phenolic foams have not been successful is that phenolic foams heretofore have exhibited unsatisfactory initial thermal conductivity or an undesirable increase in thermal conductivity over time. Additionally, the compressive strength of prior art phenolic foam is not as high as desirable for normal handling. It has also been reported that prior art phenolic foams have serious problems with friability and punking.

The general composition and method for preparing phenolic foam are well known. Generally, a foamable phenolic resole composition is prepared by admixing aqueous phenolic resole, blowing agent, surfactant, optional additives and an acid curing agent into a substantially uniform mixture. The curing catalyst is added in amounts sufficient to initiate the curing reaction which is highly exothermic. The exotherm of the curing reaction vaporizes and expands the blowing agent thereby foaming the composition. The foaming process is preferably performed in a substantially closed mold.

The general method for the continuous manufacture of phenolic foam insulation board is as follows. The foamable phenolic resole composition is prepared by continuously feeding into a suitable mixing device the aqueous phenolic resole, blowing agent, surfactant, optional additives, and acid curing catalyst. The ratio of these ingredients is varied depending on the density, thickness, etc. desired in the final product. The mixing device combines these ingredients into a substantially uniform mixture which is continuously applied evenly onto a moving substrate, usually a protective covering such as cardboard, which adheres to the foam. The foaming composition is usually covered with another protective covering such as cardboard which becomes adhered to the phenolic foam. The covered foaming composition is then passed into a double belt press type apparatus where the curing exotherm continues to vaporize and expand the blowing agent, thereby foaming the composition as it is cured.

As mentioned, one of the main drawbacks of prior art phenolic foam is an unsatisfactory initial thermal conductivity (k value). It is believed that one of the main causes of phenolic foam having a poor initial thermal conductivity is due to the rupturing of the cell walls during the foaming and early curing of the foamable phenolic resole composition. This rupturing causes an immediate loss of fluorocarbon blowing agent which results in a poor initial thermal conductivity. Ruptured cell walls also readily absorb water, causing a further increase in thermal conductivity. It is also believed that ruptured cell walls deleteriously affect the compressive strength and other properties of the phenolic foams. Another main cause of initial poor thermal conductivity in phenolic foams is the loss of fluorocarbon blowing agent before the cell walls of the foaming compositions are sufficiently formed to entrap the blowing agent.

In copending applications, there are disclosed several methods for preventing the rupturing of cell walls during foaming and the loss of blowing agent before the cell walls are formed strong enough to entrap the blowing agent. These methods comprise foaming and curing the foamable phenolic resole composition while maintaining pressure on the foaming mixture and using a phenol formaldehyde resin having certain molecular weight characteristics.

Also as mentioned, another drawback of prior art phenolic foams is the undesirable increase of thermal conductivity over time (k factor drift). Even in the prior art foams which have cell walls which are not ruptured and which have the fluorocarbon entrapped in the cells, the phenolic foams have a tendency to lose the fluorocarbon blowing agent over time with a corresponding increase in thermal conductivity. It is believed that there are two main causes of the increase in thermal conductivity over time.

One cause of the increase of thermal conductivity over time is cracking of the cell walls. In many prior art phenolic foams the cell walls are very thin. When phenolic foams having thin cell walls are subject to high temperatures, the cell walls dry out and crack. Also, since thermal insulation is normally subject to heating and cooling cycles with concomitant expansion and contractions, the cracking of the thin cell walls is aggravated. Cracking of the cell walls allows the fluorocarbon blowing agent to leak out with a loss of thermal insulation and an increase in thermal conductivity.

In our copending application, there is disclosed a means for preventing the cracking of the thin cell walls. This was accomplished by using a phenolic resole having certain molecular weight characteristics which make it possible to produce phenolic foam having cell walls thick enough to withstand thermal and mechanical stresses without cracking.

The main cause of the increase of thermal conductivity over time is the presence of small perforations or pinholes in the cell walls. These small perforations allow the fluorocarbon blowing agent to diffuse out over time and be replaced by air. This slow replacement by air causes an increase in thermal conductivity and loss of thermal insulation. The small perforations also allow the phenolic foam to absorb water, thereby further increasing the thermal conductivity.

In accordance with the present invention, it has been found that perforations in the cell walls are caused by the presence of water in the foamable phenolic resole composition, particularly water that is present in the acid curing catalyst. Accordingly, it is the object of this invention to provide a composition and method of making phenolic foam in which the cell walls are substantially free of perforations.

Another object of this invention is to provide a composition and method for making phenolic foam which does not lose its thermal insulation properties over time.

Another object of this invention is to provide a phenolic foam that has cell walls which are substantially free of perforations.

Additional objects and advantages of the present invention will be apparent to those skilled in the art by reference to the following description and drawings.

SUMMARY OF THE INVENTION

The present invention comprises a composition and method for making phenolic foam which has cell walls substantially free of perforations. The method comprises foaming and curing an aqueous phenolic resole with an anhydrous aryl sulfonic acid catalyst or mixtures thereof that has a pKa less than about 2.0 and that reduces the compatibility of the phenolic resole with water sufficiently enough to prevent perforations in the cell walls of the phenolic foam. The anhydrous aryl sulfonic acid catalysts that are useful in the invention are those aryl sulfonic acids which are strongly acidic, which have a higher degree of compatibility or affinity for the phenolic resole than for water and which lower the compatibility of the resole with water. Some of the useful anhydrous aryl sulfonic acid catalysts may be represented by the following formula:

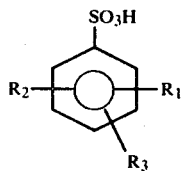

where $R_1$, $R_2$, and $R_3$ are independently selected from H, lower alkyl groups of 1-6 carbon atoms, $NH_2$, $SO_3H$, halogen and non polar groups and where the sum of the carbons in $R_1$, $R_2$ and $R_3$ is less than 12. Some other useful anhydrous aryl sulfonic acids are the naphthalene sulfonic and substituted naphthalene sulfonic acids. The preferred catalysts are where $R_1$, $R_2$ and $R_3$ are selected from H and lower alkyl groups of 1-3 carbon atoms. It is also within the scope of this invention to use mixtures of anhydrous aryl sulfonic acids and, in fact, the most preferred catalyst is a combination of a toluene sulfonic acid and xylene sulfonic acid. It should be noted that all acids of the present invention are not covered by the above formula nor are all acids covered by the above fonmula part of the invention. The criteria for determining whether an acid is part of the invention are whether the acid has a pKa less than about 2.0 and changes the compatibility of the phenolic resole with water sufficiently enough to prevent perforations in the cell walls.

The composition of the present invention is a foamable phenolic resole composition comprising a phenolic resole containing water, surfactant, blowing agent, optional additives and an acid curing catalyst. The acid curing catalyst is an anhydrous aryl sulfonic acid as described herein.

BRIEF DESCRIPTION OF THE DRAWINGS

Like numerals refer to like parts in the following drawings.

FIG. 2 illustrates diagrammatically a side view of cross sections of a double belt type apparatus for continuously making phenolic foam on a commercial scale.

FIG. 3 illustrates diagrammatically a partial sectional view taken along line III—III of FIG. 2.

DETAILED DESCRIPTION OF THE INVENTION

Figure 1A:
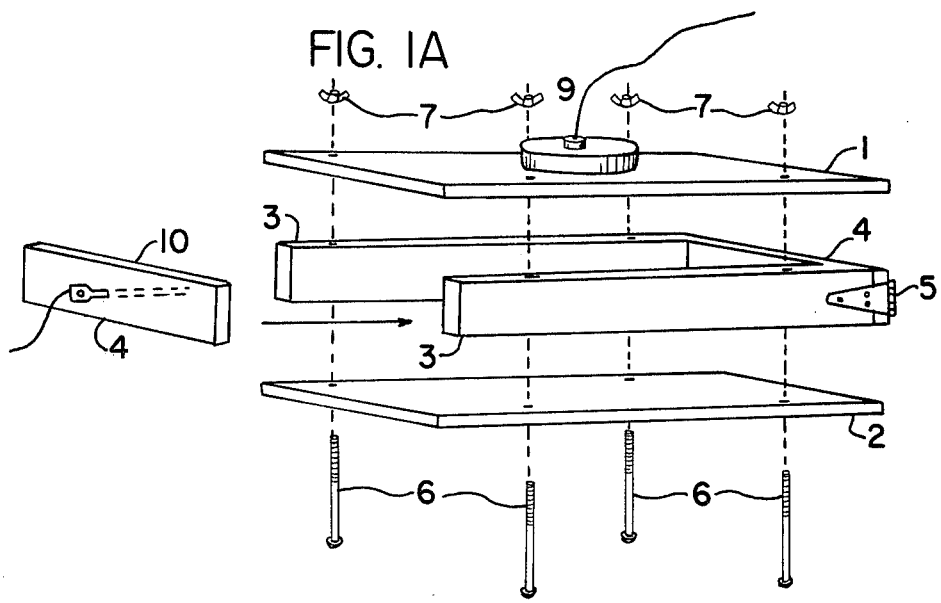
FIGS. 1A and 1B illustrate diagrammatically in partial cross section substantially closed molds used in making phenolic foam in the laboratory.

As mentioned above, the use of phenolic foams for thermal insulation applications, particularly for roofs, walls and pipes, is highly desirable because of the excellent fire properties that are inherent in phenolic foams. However, phenolic foams heretofore known suffer from generally unacceptable initial k factors or their inability to retain a low k factor over a period of time. The thermal insulating ability of a foamed material generally may be evaluated by the thermal conductivity or k factor. The thermal conductivity or k factor of a particular insulation material is measured according to ASTM Method C-518 Revised and is expressed dimensionally as BTU per inch per hour per square foot per ° F. The lower the k factor, the better is the insulating quality of the material. Additionally, the longer the foam can retain a low k factor, the better is the insulating efficiency of the material.

A low k factor is understood to mean a k factor substantially below about 0.22, which is approximately the k factor of air. An initially low k factor is understood to mean a k factor of substantially below 0.22 when measured after the foam that is initially produced comes to an equilibrium water content, generally within about five days. It has been found that the phenolic foam may have k factors that decrease during the first several days as the water content of the phenolic foam comes to equilibrium with the environment. Thereafter, the k factor remains substantially constant over time. Preferred phenolic foams made in accordance with the present invention have initial k factors measured according to the ASTM method of less than 0.15 and generally in the range of 0.10 to 0.13. This low k factor is retained over time and there is little or no increase of k factor.

Phenolic foams made in accordance with the invention generally have overall densities (i.e., including foam skin) ranging from about 1.5 to about 5.0 pounds per cubic foot (about 24 to about 80 kg/cu. meter) and preferably ranging from about 2.0 to about 4.0 pounds per cubic foot (about 32 to about 64 kg/cu. meter) and core densities (i.e., without foam skin) ranging from about 1.5 to about 4.5 pounds per cubic foot (about 24 to about 72 kg/cu. meter) and preferably ranging from about 2.0 to about 3.5 pounds per cubic foot (about 32 to about 56 kg/cu. meter). The preferred phenolic foams are substantially closed-cell foams (i.e., substantially free of ruptured cell walls) generally containing at least 90 to 95 percent closed cells and typically greater than 95 percent closed cells as measured, for example, by an air pycnometer according to test ASTM D-2865-70 (1976).

The k factor of a phenolic foam is directly related to the ability of the foamable phenolic resole composition to entrap the blowing agent during the foaming and curing steps and to retain the blowing agent over time. The thermal conductivity of a phenolic foam is directly related to the thermal conductivity of the entrapped gas. A phenolic foam that has only air entrapped would be expected to have a k factor of approximately 0.22. A phenolic foam that has a fluorocarbon entrapped would be expected to have a k factor approaching the thermal conductivity of the entrapped fluorocarbon. Commercial fluorocarbons have k factors around 0.10. Accordingly, an excellent phenolic foam will have a k factor around 0.10 and will retain this k factor over time. The preferred phenolic foams made in accordance with this invention have such a k factor and retain this k factor over time.

As mentioned herein, one of the main causes of the loss of k factor over time is the presence of small pinholes or perforations in the cell walls of the phenolic foam. These small perforations allow the fluorocarbon blowing agent to diffuse outward from the cells through the perforations in the cell walls and be replaced by an inward diffusion of air. The replacement of fluorocarbon by air causes an increase in the k factor and loss of thermal insulation value. The small perforations also allow the phenolic foam to absorb water which causes a further increase in k factor and loss of thermal insulation value.

In accordance with the present invention, perforations in the cell walls are substantially eliminated by using certain anhydrous aryl sulfonic acids as the foaming and curing catalyst. The term cell walls as used herein include the struts which are formed where the cell walls are joined together and the present invention also eliminates the perforations in the struts. It has been found that the cause of the perforations in the cell walls is the effect of water on the cell walls during the foaming and curing steps. The aqueous phenolic resole has a certain compatibility for water. During the foaming and curing steps, the phenolic resole is being crosslinked and goes from a water compatible resole to a somewhat water incompatible foam. As the phenolic resole goes from water compatibility to a state of substantially reduced water compatibility during the foaming and curing, it expels water. This expulsion of water from the phenolic resole as it is crosslinked during foaming and curing causes perforations in the cell walls. In particular, it has been found that the presence of water in the catalyst system is especially deleterious and adds significantly to the number of perforations found in the cell walls. It has also been found, in accordance with this invention, that the presence of water in the catalyst can cause significant rupturing of the cell walls, but the primary cause of rupturing is the lack of restraining pressure in the mold and the use of highly exothermic phenolic resoles. In accordance with the present invention, it has been found that the perforations in the cell walls can be significantly reduced and, in fact, substantially eliminated by using certain anhydrous aryl sulfonic acids as the foaming and curing catalyst. The amount of anhydrous aryl sulfonic acid used is generally more than the amount necessary to merely catalyze the phenolic foam reaction.

Although not intending to be bound by any theories, it is believed that the anhydrous aryl sulfonic acids of the present invention work in the following manner. The anhydrous aryl sulfonic acids useful in the present invention are strong organic acids which very readily catalyze the reaction of the phenolic resole to a thenmoset polymer. In the foamable phenolic resole compositions, the anhydrous aryl sulfonic acids have a low water compatibility and a higher resin compatibility. When the anhydrous aryl sulfonic acids are thoroughly mixed with the phenolic resole containing water during the preparation of the foamable phenolic resole composition, they rapidly change the water compatibility of the resole and immediately begin to expel water from the resole before substantial foaming and curing occur so that the resulting foam is substantially free from perforations in the cell walls. Since the anhydrous aryl sulfonic acid is the foaming and curing catalyst, the water is expelled from the phenolic resole as the foaming and curing reactions are initiated. It is believed that the anhydrous aryl sulfonic acid causes water to be expelled from the aqueous resole at a time and rate that is earlier and quicker than the liberation of water caused by the crosslinking of the foaming and curing reaction. The anhydrous aryl sulfonic acid does not expel all of the water from the aqueous phenolic resole, but it is believed that it expels sufficient water and at a sufficient rate so that the amount of water remaining in the phenolic resole is not expelled by the crosslinking reaction in amounts to cause ruptures or perforations during foaming and curing.

It is also necessary that the aryl sulfonic acids are anhydrous, i.e., contain limited amounts of free water, and the term anhydrous aryl sulfonic acid as used herein is meant to cover these limited amounts of water. In accordance with this invention it has been found that in order to eliminate the perforations in the cell walls it is necessary that the aryl sulfonic acid contain less than about 10 percent by weight free water. It has also been found that in order to obtain cell walls that are free from both perforations and ruptures caused by water it is necessary that the anhydrous aryl sulfonic acids contain less than about 3.0 percent by weight free water and preferably less than 0.5 percent by weight free water. Each particular aryl sulfonic acid has a different phase relationship with water and the phenolic resole. This phase relationship is dependent on such factors as the particular phenolic resole, the water content of the resole and the amount of water in the aryl sulfonic acid. The maximum amount of water that may be tolerated by any particular aryl sulfonic acid and still yield a phenolic foam free of perforations may be readily determined by preparing a series of phenolic foams using the aryl sulfonic acid containing various amounts of water and examining the resulting foams for perforations with a scanning electron microscope. This evaluation procedure is set forth herein. However, as set forth above, in order to prepare phenolic foam having cell walls substantially free of perforations and ruptures caused by water it has been found that the aryl sulfonic acid must have less than 3.0 percent free water and preferably less than 0.5 percent. If the aryl sulfonic acids contain too much water, they are not efficient enough in expelling the water from the phenolic resole and will not expel the water in the catalyst itself. Accordingly, there will be too much water present during the foaming and curing and the result will be a phenolic foam containing perforations in the cell walls. The term free water means water that is not bound to the catalyst molecules. For example, toluene sulfonic acid is available as the monohydrate. Toluene sulfonic acid monohydrate will reduce the perforations in the cell walls of the phenolic foam. However, if additional water is present the hydrated aryl sulfonic acids will not work. Additionally, the hydrated aryl sulfonic acids are not preferred since they are not as effective as the anhydrous aryl sulfonic acids and the monohydrated aryl sulfonic acids are generally crystalline and more difficult to uniformly mix into the foamable phenolic resole composition.

All anhydrous aryl sulfonic acid catalysts wll not overcome the problem of perforations in the cell walls caused by water. Only anhydrous aryl sulfonic acids having a strong acidity (i.e., a pKa value of less than about 2.0) combined with a phase relationship with water and the phenolic resole such that the anhydrous aryl sulfonic acid reduces the compatibility of the aqueous phenolic resole with water enough to expel sufficient water from the resole to prevent perforations in the cell walls are useful in the present invention. When anhydrous aryl sulfonic acids having this combination of properties are thoroughly mixed with the phenolic resole containing water, they rapidly expel water from the phenolic resin before substantial foaming and curing occur so that the resulting foam is substantially free of perforations in the cell walls. The expelled water ends up in the cells of the foam and since the cured foam exhibits a certain water compatibility, the expelled water diffuses out of the foam as the foam is dried to equilibrium conditions. Since the anhydrous aryl sulfonic acid is the foaming and curing catalyst, the water is expelled from the phenolic resole at a very early stage in the foaming and curing reactions and is not present in the resole in sufficient quantities to cause perforations. The anhydrous aryl sulfonic acid catalyst does not expel all of the water from the aqueous phenolic resole but expels sufficient water so that perforations in the cell walls do not occur.

Even though the generic class of aryl sulfonic acids are well known foaming and curing catalysts for phenolic foams, all of these aryl sulfonic acids, even in the completely anhydrous state, will not work. Only those anhydrous aryl sulfonic acids having a pKa of less than about 2.0 combined with the required resole/water/anhydrous acid phase relationship are effective. For example, phenol sulfonic acid is a well known aryl sulfonic acid that has been used for years to foam and cure phenolic foam. However, even completely anhydrous phenol sulfonic acid will not work in the present invention since it does not have the required compatibility properties with water and the resoles. It is believed that the polar hydroxyl group gives the phenol sulfonic acid a water compatibility that is too high. The resulting resole/water/anhydroys sulfonic acid phase relationship is such that water is not expelled from the resole at a sufficient rate and/or in sufficient amounts by the acid and the resulting foam has perforations. Similarly, alkyl sulfonic acids are strong acids that have been used for years to cure phenolic resoles. However, the anhydrous alkyl sulfonic acids do not have the capability of sufficiently altering the compatibility of the aqueous resole with water.

Some of the useful anhydrous aryl sulfonic acid catalysts that have the required acidity in combination with the required water/resole compatibility relationship may be represented by the following formula:

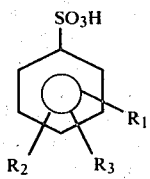

where $R_1$, $R_2$, and $R_3$ are independently selected from H, lower alkyl groups of 1-6 carbon atoms, $NH_2$, $SO_3H$, halogen and non polar groups and where the sum of the carbons in $R_1$, $R_2$ and $R_3$ is less than 12. Some other useful anhydrous aryl sulfonic acids are the naphthalene sulfonic acid and the substituted naphthalene sulfonic acids. The preferred catalysts are where $R_1$, $R_2$ and $R_3$ are independently selected from hydrogen and lower alkyl groups of 1-3 carbon atoms. The most preferred catalysts are toluene sulfonic acid and xylene sulfonic acid, especially a combination of these two acids. It should be noted that all acids of the present invention are not covered by the above formula nor are all acids covered by the above formula part of the invention. The criteria for determining whether an acid is part of the invention are whether the acid has a pKa less than about 2.0 and changes the compatability of the phenolic resole with water sufficiently enough to prevent perforations in the cell walls.

It is also within the scope of this invention to add limited amounts of other acids, particularly in the anhydrous form, to the anhydrous aryl sulfonic acids provided such additional acids do not prevent the anhydrous aryl sulfonic acid from changing the compatibility of the resole with water sufficiently enough to prevent perforations in the cell walls. Examples of such acids that may be tolerated in limited amounts include phosphoric, sulfuric, methane sulfonic and ethane sulfonic. For example, limited amounts of phosphoric acid or boric acid may be useful in improving the fire retardant and non-punking properties of the foam. In addition, small amounts of sulfuric acid may be added to increase the rate of foaming and curing.

The applicability of any particular anhydrous aryl sulfonic acid in the present invention for reducing or eliminating perforations in the cell walls of phenolic foams can easily and readily be determined. First, a composition is prepared using an aqueous phenolic resole, surfactant and blowing agent in accordance with the preferred procedure described herein. Then 84 parts of the composition is foamed and cured using 16 parts of the anhydrous aryl sulfonic acid to be evaluated. The cell walls of the resulting foam are examined with a scanning electron microscope. If the cell walls are substantially free of perforations, the catalyst is useful in the present invention; however, if the cell walls contain perforations, the catalyst is not of the present invention. In preparing the test foam it is possible to add the optional additives. The ratio of the various ingredients may be varied somewhat but it is desirable to keep them within the preferred ranges set forth herein.

The method of the present invention generally comprises preparing a foamable phenolic resole composition and foaming and curing the composition. The foamable phenolic resole composition of the present invention generally comprises an aqueous phenolic resole, fluorocarbon blowing agent, surfactant, optional additives and an acid curing catalyst. The acid curing catalyst is an anhydrous aryl sulfonic acid or mixtures of anhydrous aryl sulfonic acids of the present invention which expel water, foam and cure the foamable composition. The ratios of the various ingredients of the foamable phenolic resole composition will vary depending on the density, compressive strength, etc. desired in the final product.

In the preferred method, the foamable phenolic resole composition containing the anhydrous aryl sulfonic acid of the present invention is introduced into a substantially closed mold and allowed to foam and cure in the mold. The mold is capable of withstanding the pressures generated by the foaming composition. The amount of pressure will vary depending on such factors as the amount and type of blowing agent, the amount and reactivity of the resole and the amount of catalyst. Generally, the pressure generated will be from about 3 to 15 psi above atmospheric pressure and the mold should be designed accordingly. The amount of foamable phenolic resole composition introduced into the mold will vary depending on the properties desired of the final product.

The various components of the foamable phenolic resole composition may be mixed together in any order provided the resulting composition is uniform. It should be noted, however, that the anhydrous aryl sulfonic acid causes the foamable composition to begin to foam within seconds of being mixed with the phenolic resole and the foaming composition reaches a maximum pressure within minutes. Accordingly, the catalyst should be the last component added to the foamable phenolic resole conposition. In the preferred continuous method some of the components may be premixed before they are metered into the mixing device. However, for the reasons set forth above, the catalyst should be the last ingredient entering the mixing device.

The anhydrous aryl sulfonic acid may be added as a solid or liquid. Liquid acids are preferred because they are easier to handle in commercial mixing devices. The anhydrous catalysts may also be added as solutions, suspensions or emulsions in organic solvents such as glycerine or glycol. Solutions, suspensions or emulsions are not preferred since they add additional ingredients which may affect the properties of the phenolic foam and tend to reduce the reactivity of the system.

Figure 1B:
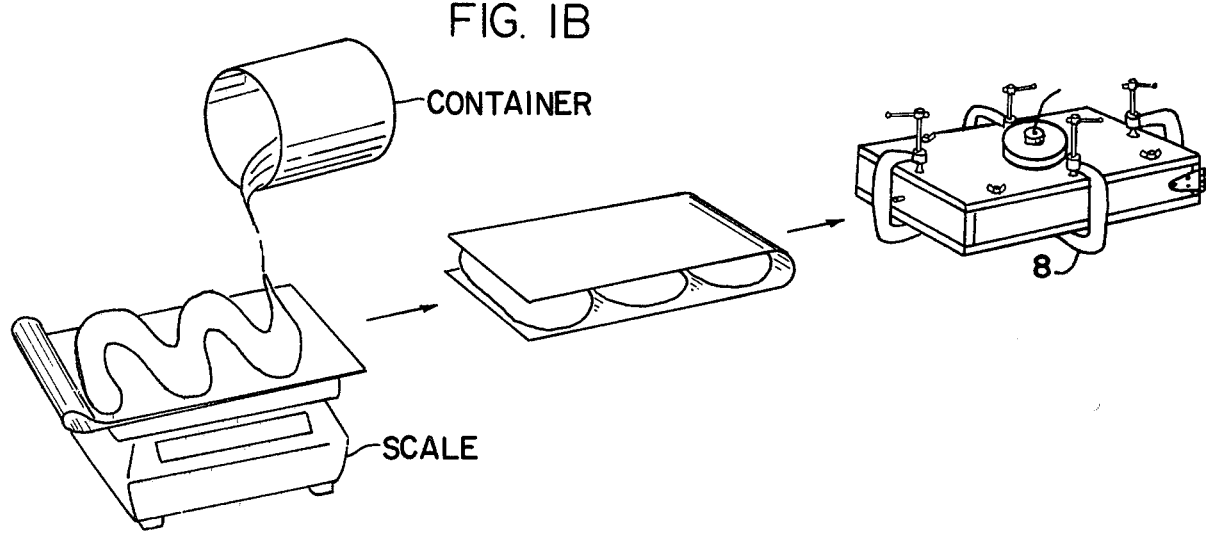

In one method for making phenolic foam normally used in the laboratory, the phenolic resole foamable composition is introduced into a rigid, closed mold as illustrated, for example in FIGS. 1A and 1B. The phenolic resole foamable composition expands initially under essentially atmospheric pressure. As the foamable composition expands to fill the mold, it generates pressure against the walls of the mold. The mold is designed to withstand pressures up to about 15 psi above atmospheric pressure.

With respect to FIGS. 1A and 1B, the mold is comprised of top plate (1), bottom plate (2), side walls (3), and end walls (4). The side walls (3) and one end wall (4) are held together by hinges (5). When in a closed position, the top and bottom plates and the side walls are held in position by bolts (6) and wing nuts (7). In addition, in order to withstand the possible high pressures, a series of C-clamps (8) are attached around the perimeter of the mold during the foaming and curing steps. The mold is also provided with a pressure transducer (9) for measuring the pressure in the mold and a thermocouple (10) for measuring the temperature in the mold. The operation of the laboratory mold will be described more fully hereinafter. The size of the mold can be varied by changing the dimensions of the walls and plates.

In another embodiment of the invention employing a preferred continuous processing technique, the phenolic foam is produced in a double belt press type apparatus illustrated generally in FIGS. 2-5. The ingredients of the foamable phenolic resole composition containing the anhydrous catalyst of the present invention are metered in the desired ratios into a suitable mixing device (not shown) and then applied to a lower facing material (25) such as cardboard containing a thin layer of aluminum, a glass mat, a rigid substrate such as hardboard, or a vinyl skin, which material is caused to exit a container (not shown) and move along a table (29) by a lower conveyor (12). The foamable phenolic resole composition is applied by means of a suitable distribution device (30) which moves in a back-and-forth motion transversely to the direction of movement of the lower facing material (25), although any suitable means for evenly distributing the composition such as a multiple stream mix head or a series of nozzles may be employed. As the foamable composition is carried downstream, it foams and is contacted by an upper facing material (27) and is directed by means of rollers (22) and (23) to the region where the foamable composition is in a very early stage of expansion. As the foamable composition expands initially under substantially ambient atmospheric pressure, it is carried into a curing cavity (28) foamed by the lower portion of an upper conveyor (11), the upper portion of the lower conveyor (12), and two fixed, rigid side walls called side rails not shown in FIG. 2 but illustrated by (41) and (42) in FIG. 3. The thickness of the foam is determined by the distance of the upper conveyor (11) from the lower conveyor (12). The upper conveyor (11) can be moved by any suitable lifting means (not shown) perpendicularly to the lower conveyor (12) which, itself, cannot be raised or lowered. When the upper conveyor (11) is raised or lowered, it moves between the fixed rigid side walls (41 and 42) as illustrated in FIG. 3, which walls are immediately adjacent to the sides of the upper conveyor (11). The surfaces of the conveyors which contact the upper and lower facing materials comprise a plurality of pressure plates (13 and 14) fixed to the conveyor by rigid attaching means (21). The pressure plates may be heated, if necessary, by means of hot air which is introduced into and circulated inside the upper and lower conveyors by means of air ducts not shown in the drawings.

Figure 4:
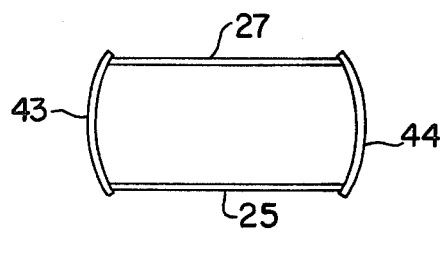
FIG. 4 illustrates diagrammatically a cross-sectional view taken along line IV—IV of FIG. 3.
Figure 5:
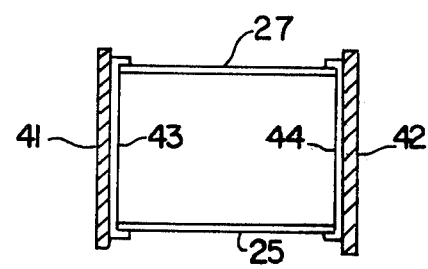
FIG. 5 illustrates diagrammatically a cross-sectional view taken along line V—V of FIG. 3.

Simultaneously with the upper and lower facing papers, side papers (43 and 44), as illustrated in FIG. 3, containing a foam-releasing material such as a thin film of polyethylene are guided into the curing cavity by rollers (45 and 46) and means such as guide bars (47 and 50). Each of the guide bars is placed just ahead of the curing cavity (28) such that the side papers (43 and 44), before contacting the side walls (41 and 42), overlap the upper and lower facing materials, for example, as illustrated in FIG. 4. As the side papers (43 and 44) contact the side walls (41 and 42), they flatten as illustrated in FIG. 5.

When the foam has expanded to fill the thickness of the curing cavity, further expansion is constrained by the pressure plates (13 and 14) as illustrated in FIG. 2, and the side walls (41 and 42) as illustrated in FIG. 3. The pressure exerted by the foam on the pressure plates and side walls will vary as described above but typically will be in the range of about 3 pounds per square inch to about 15 pounds per square inch. The pressure plates (13 and 14) and side walls (41 and 42) are designed to withstand such pressures.

Processing parameters such as the amounts of the conponents of the foamable phenolic resole composition, the flow rate of the composition from the distribution device, and the conveyor speed may be varied widely in the practice of the invention to provide phenolic foam having the desired thickness, density, etc. Sufficient foamable composition should be used to ensure that foam fills the mold and exerts a pressure against the mold walls.

After the phenolic foam leaves the curing cavity, the side papers (43 and 44) are removed, for example, by means of rollers (48 and 49), as illustrated in FIG. 3. The foam may be cut to desired lengths depending on the intended use.

The foamable phenolic resole compositions of the invention generally comprises an aqueous phenolic resole, blowing agent, surfactant, optional additives, and the anhydrous aryl sulfonic catalyzing acid. The ratios of the various ingredients may vary but are generally within the ranges set forth below. The optional additives of the preferred compositions also contain a plasticizer and a formaldehyde scavenger.

The method of preventing perforations in the cell walls of a phenolic foam using anhydrous aryl sulfonic acids is applicable to any aqueous phenolic aldehyde resole derived from the base condensation of a phenolic compound and an aldehyde. In addition to phenol itself, other phenolic compounds may be used. Examples of other suitable phenolic compounds include resorcinol; catechol; ortho, meta, and para cresols; xylenols; ethyl phenols; p-tert-butyl phenol and the like. Dinuclear phenolic compounds may also be used. The preferred phenolic aldehyde resoles will contain primarily phenol with only minor amounts, if any, of other phenolic compounds.

In addition to formaldehyde other aldehydes can be used in the phenolic aldehyde resole. Examples are glyoxal, acetaldehyde, chloral, furfural and benzaldehyde. The preferred resoles will contain primarily formaldehyde with minor amounts, if any, of the other aldehydes.

The term phenolic resole as used herein is meant to include the use of phenolic compounds other than phenol and/or aldehydes other than formaldehyde. It should be noted that phenolic resoles containing significant amounts of phenolic compounds other than phenol and/or aldehydes other than formaldehyde will have a different resole/water phase relationship. For instance, o-cresol changes the compatibility of the resole w th water. Accordingly, different amounts of anhydrous aryl sulfonic acids than those set forth herein for primarily phenol formaldehyde resoles may be necessary for other types of resoles. Some of these types of resoles may have a resole/water compatibility that cannot be sufficiently modified by an anhydrous aryl sulfonic acid to prevent perforations.

The phenol formaldehyde resoles may have a molar ratio of aldehyde to phenolic compound of from about 1:1 to about 3:1; however, preferred resoles will have a ratio of about 1.7:1 to 2.3:1. The resoles are prepared by the condensation of phenolic compound and aldehyde in the presence of an alkaline catalyst. The alkaline condensation of a phenolic compound and an aldehyde is well known.

The preferred phenolic resoles used in the present invention are essentially condensation polymers of phenol and formaldehyde having molar ratios of formaldehyde to phenol of from about 1.7:1 to 2.3:1 and more preferably from about 1.75:1 to 2.25:1. The preferred phenolic resole has a weight average molecular weight greater than 800 and preferably from 950–1500. The preferred resoles have a number average molecular weight greater than about 350 and preferably from about 400 to about 600 and a dispersivity greater than 1.7, preferably from 1.8 to 2.6. These resoles are covered by a copending application and can be foamed and cured with the required amounts of aryl sulfonic acids of this invention without reaching peak exotherms over 100° C. until the cell walls of the foam are substantially cured and without reaching peak pressures that rupture the cell walls before they are sufficiently cured, even in a closed mold.

The amount of phenolic resole present in the foamable phenolic resole compositions may vary within wide limits provided it is in an amount sufficient to produce foam having the desired density and compressive strength. Generally, the amount of phenolic resole present in the foamable composition ranges from about 40 percent to about 70 percent by weight of the composition. An amount in the range of from about 45 percent to about 55 percent by weight of the foamable composition is preferred. The above weight percent of phenolic resin in the foamable composition is based on 100 percent active phenolic resin. Since the resole is an aqueous solution, the actual concentration of the resole must be accounted for in calculating how much of the aqueous resole solution goes into the foamable phenolic resole composition.

The blowing agent may comprise any suitable blowing agent. In choosing the blowing agent, it must be remembered that the k factor of the phenolic foam is directly related to the k factor of the blowing agent entrapped in the phenolic foam. Although blowing agents such as n-pentane, methylene chloride, chloroform and carbon tetrachloride and the like may be used, they are not preferred since they do not have the excellent thermal insulation properties of fluorocarbon blowing agents. In addition, fluorocarbon blowing agents are not soluble in the phenolic foam and hence will not diffuse out over time, while some of the above mentioned blowing agents have a certain compatibility with the phenolic foam and hence may diffuse out over time. They may be used, however, in combination with the preferred fluorocarbon blowing agents. Examples of suitable fluorocarbon blowing agents include: dichlorodifluoromethane; 1,2-dichloro-1,1,2,2-tetrafluoroethane; 1,1,1-trichloro-2,2,2-trifluoroethane; trichloromonofluoromethane; and 1,1,2-trichloro-1,2,2-trifluoroethane. It is preferred that the blowing agent comprise a chlorofluorocarbon blowing agent. The blowing agent may be a single blowing agent compound or it may be a mixture of such compounds. Ordinarily, the fluorocarbon blowing agents employed have boiling points at atmospheric pressure, viz., an absolute pressure of 760 millimeters of mercury, in the range of from about −5° C. to about 55° C. An atmospheric boiling point in the range of from about 20° C. to about 50° C. is typical. The preferred blowing agent is a mixture of trichloromonofluoromethane and 1,1,2-trichloro-1,2,2-trifluoroethane. It is especially preferred that the weight ratio of the trichloromonofluoromethane to the 1,1,2-trichloro-1,2,2-trifluoroethane in the mixture be from about 1:1 to 1:3.

The blowing agent generally is present in the foamable composition in an amount which will produce phenolic foam having an initial low k factor. The amount of blowing agent may vary widely but it generally ranges from about 5 percent to about 20 percent by weight of the foamable composition. An amount of blowing agent in the range of from about 5 percent to about 15 percent by weight of the foamable composition is typical. An amount in the range of from about 8 percent to about 12 percent by weight is preferred.

The foamable phenolic resole composition also contains a surfactant. The surfactant should exhibit properties which enable it to effectively emulsify the phenolic resole, blowing agent, catalyst and optional additives of the foamable composition. To prepare a good foam, the surfactant should lower the surface tension and stabilize the foam cells during foaming and curing. It has been found that non ionic, non hydrolyzable silicone glycol surfactants are most useful, although any surfactant having the requisite properties described above may be employed. Specific examples of suitable surfactants include L-7003 silicone surfactant, L-5340 silicone surfactant (which is a preferred surfactant), L-5350 and L-5420 silicone surfactants, all from Union Carbide Corporation, and SFI188 silicone surfactant from General Electric Company. One class of surfactants which may be used are the non ionic organic surfactants such as the condensation products of alkylene oxides such as ethylene oxide, propylene oxide or mixtures thereof, and alkylphenols such as nonylphenol, dodecylphenol and the like. Other suitable organic surfactants are known and include, for example, those disclosed in U.S. Pat. No. 3,389,094, so much of which as regards organic surfactants is hereby incorporated by reference.

Another class of suitable surfactants which may find application in the present invention include siloxane-oxyalkylene copolymers such as those containing Si-O-C as well as Si-C linkages. Typical siloxane-oxyalkylene copolymers contain a siloxane moiety composed of recurring dimethylsiloxy units endblocked with monomethylsiloxy and/or trimethylsiloxy units and at least one polyoxyalkylene chain composed of oxyethylene and/or oxypropylene units capped with an organic group such as an ethyl group. Specific examples of suitable siloxane-oxyalkylene polymers may be found in U.S. Pat. No. 3,271,331, so much of which as regards siloxane-oxyalkylene surfactants is hereby incorporated by reference. Care must be taken in selecting the surfactant since some surfactants will adversely affect the viscosity of the foamable phenolic resole compositions or cause the collapse of the foam before it is set.

The surfactant used in the foamable composition may be a single surfactant or a mixture of surfactants. The surfactant is used in the present invention in an amount sufficient to produce a good emulsion. Generally, the amount of surfactant ranges from about 0.1 percent to about 10 percent by weight of the foamable phenolic resole composition. Typically, the amount of surfactant ranges from about 1 percent to about 6 percent by weight of the composition. An amount of surfactant in an amount of from about 2 percent to about 4 percent by weight of the composition is preferred.

The surfactant may be separately mixed with the phenolic resole, blowing agent and catalyst to form the foamable phenolic resole composition or it may be admixed with the phenolic resole or blowing agent before blending with the other components. Alternatively, part of the surfactant may be premixed with the phenolic resole and part may be premixed with the blowing agent. It is preferred that about ⅓ of the surfactant be premixed with the fluorocarbon blowing agent and ⅔ be premixed with the phenolic resole.

Although water is believed to be the main cause of perforations in the cell walls and to contribute to the rupturing of cell walls, the presence of water is necessary. First of all, it is very difficult and expensive to produce a phenolic resole that has very little or no water. Moreover, phenolic resoles without water are extremely difficult to handle. They are very viscous and difficult to formulate into foamable compositions. In addition, it is difficult to control the exotherm of the reaction without water. Accordingly, water is necessary in the phenolic resole foamable composition to adjust the viscosity of the phenolic resole and the resulting foamable phenolic resole composition to that which is favorable for producing phenolic foams. In addition, water is desirable to act as a heat sink and help control the exothermic foaming and curing reaction. Most of the water is present in the phenolic resole although very limited amounts may be tolerated in the fluorocarbon blowing agent or surfactant. Only limited quantities may be tolerated in the anhydrous aryl sulfonic acid catalyst. The phenolic resole foamable composition will contain at least about 5 percent water. Concentrations of water above 20 percent should be avoided since even the preferred catalyst cannot expel sufficient water to substantially eliminate the perforations when this much water is originally present in the foanable composition. An amount ranging from about 7 percent to about 16 percent by weight is preferred. As stated above, limited amounts of water can be tolerated in the blowing agent, surfactant, or catalyst if phenolic foam having cell walls free of both perforations and ruptures caused by water is desired. In addition, it is important that the water in the aqueous resole is uniformly mixed with the resole. If the aqueous resole contains water that is not uniformly mixed with the resole, the result may be ruptured cell walls.

As mentioned herein, the anhydrous aryl sulfonic acid of the present invention serves a dual purpose. The anhydrous aryl sulfonic acid expels some water from the phenolic resole, thereby enabling the formation of a phenolic foam without perforations. The anhydrous aryl sulfonic acid also catalyzes the foaming and curing reaction to form a thermoset phenolic foam. All aryl sulfonic acids will not work in the present invention. Only those aryl sulfonic acids having high resin compatibility and low water compatibility in the range of ingredients of the foamable phenolic resole composition will work. One can readily detennine if the anhydrous aryl sulfonic acid will be acceptable by preparing a phenolic foan using the anhydrous aryl sulfonic acid and taking a scanning electron photomicrograph of the foam. Acceptable foams will not have perforations in the cell walls. Examples of suitable anhydrous aryl sulfonic acids are set forth herein. As mentioned, the preferred catalysts are toluene sulfonic acid and xylene sulfonic acid. Commercial grades of mixtures of anhydrous toluene sulfonic acid and xylene sulfonic acid are available and are thus preferred for use in the present invention. The most preferred catalyst is toluene sulfonic acid since it is the most efficient in expelling water. However, pure toluene sulfonic acid is a solid and it is difficult to prepare uniform foamable phenolic resole compositions on a commercial scale using a solid catalyst. It has been found that the use of xylene sulfonic acid with toluene sulfonic acid improves the handling characteristics without affecting the properties of the resulting foam. Accordingly, anhydrous toluene sulfonic acid containing about 10–50 percent by weight xylene sulfonic acid is most preferred.

Examples of some aryl sulfonic acids which have been found to be unacceptable because they will not sufficiently change the water/resole compatibility are phenol sulfonic, substituted phenol sulfonic, xylenolsulfonic, substituted xylenolsulfonic, and dodecylbenzene sulfonic acid.

The amount of anhydrous aryl sulfonic acid present in the phenolic resole formable composition will vary depending on such factors as the amount of water in the foamable composition and the type and characteristics of the phenolic resole. Amounts of anhydrous aryl sulfonic acid in the range of about 2 to about 6 percent by weight are sufficient to foam and cure most phenolic resole compositions; however, this amount is insufficient to expel water and produce phenolic foams without ruptures or perforations in the cell walls or to cure some resoles fast enough to entrap the blowing agent. In accordance with the present invention, the anhydrous sulfonic acid is present in amounts of at least about 6 percent by weight of the foamable compositions. Less than 6 percent does not adequately control the effect of water on the formation of cell walls without ruptures or perforations. The upper limit on the amount of anhydrous aryl sulfonic acid used is determined by such factors as the amount and reactivity of the phenolic resole used; however, amounts greater than 20 percent by weight generally cause the foaming and curing to exotherm too quickly, thus driving off the fluorocarbon blowing agent before the cells are formed sufficiently to entrap the fluorocarbon blowing agent. Amounts greater than 20 percent may be necessary if the aryl sulfonic acid is a monohydrate or contains the maximum amount of allowable free water. The preferred amounts are from 12–16 percent by weight.

In addition to the aqueous phenolic resole, fluorocarbon blowing agent, anhydrous aryl sulfonic acid, and surfactant, the foamable phenolic resole compositions of the present invention may contain other materials known in the art in their customary amounts for their customary purposes. Examples of such optional ingredients are as follows. Urea or resorcinol or derivatives thereof may be added to scavenge free formaldehyde, generally in the range of from 0.5 to 5.0 percent by weight, preferably 2–4 percent by weight. Plasticizers such as triphenyl phosphate, dimethyl terephthalate, or dimethyl isophthalate may also be added in amounts essentially from about 0.5 to 5 percent by weight. Antiglow, anti-spalling and anti-punking agents may also be added in amounts usually ranging from about 0.5 to 5 percent by weight. The preferred foamable phenolic resole compositions contain about 3 percent by weight urea and about 3 percent by weight plasticizer. The urea and plasticizer are preferably premixed with the phenolic resole before it is mixed with the other ingredients of the foamable phenolic resole composition.

The values of the various properties of the phenolic resoles and the phenolic foam produced therefrom were, unless otherwise set forth, determined in accordance with the following methods.

Viscosity reported herein as bubble viscosity was determined at 25° C. in a Gardner-Holdt bubble viscosity tube in accordance with ASTM D-1545-76 and is reported herein as seconds, bubble seconds or bubble viscosity.

Viscosity reported in centipoise (cps.) was determined by use of a Brookfield Viscometer Model RVF. Measurements were made when the resole was 25° C. and the spindle was chosen to give a near mid range reading at 20 rpm. Spindle number 5 was employed for most readings. (ASTM D-2196)

The pH of the resole was measured using the Fisher Accumet pH Meter Model 610 A. The pH probe was standardized with pH standards at 4.0, 7.0, and 10.0 before each use. (ASTM E-70)

The content of phenol in the resole was measured using an infrared spectrophotometric determination. The infrared determination was carried out using a recording infrared spectrophotometer with sodium chloride optics (Perkin Elmer Model No. 21), sealed liquid absorption cells and sodium chloride windows of 0.1 mm. The method consisted of measuring the infrared absorbance of an acetone solution of the phenolic resole at 14.40 microns. The phenol content of the resole sample was then determined by comparing the absorbance of the sample with the absorbance of standard solutions of known phenol content measured under identical conditions. This method has been found to be reproducible to ±0.14 percent phenol.

The free formaldehyde content in the phenolic resole was determined by the hydroxylamine hydrochloride method. The general method comprises dissolving the resole sample in methanol, adjusting the pH to bromophenol blue endpoint and adding an excess of hydroxylamine hydrochloride. The reaction liberates hydrochloric acid which is titrated with standard sodium hydroxide to the same bromophenol blue endpoint.

First, a sample of the resole is weighed to the nearest 0.1 milligram (usually 1-3 gram sample) in a 150 cc beaker containing 10 cc of methanol. The mixture is stirred until the resole is completely dissolved. The weight of resole sample used should be such that more than $\frac{1}{3}$ of the hydroxylamine hydrochloride remains after the reaction is complete. After the resole is dissolved in the methanol, 10 cc of distilled water and 10 drops of bromophenol blue indicator are added. The pH of the sample solution is adjusted by adding 0.5 N sodium hydroxide or 0.5 N sulfuric acid dropwise until the indicator just turns blue. Then 25 cc of hydroxylamine hydrochloride solution (ACS grade) is pipetted into the beaker and the reaction allowed to proceed at room temperature for 15 minutes. Then the solution is titrated rapidly with 0.5 N sodium hydroxide solution to the blue color to which the sample solution had been previously adjusted. The sample solution is magnetically stirred during the titration and the stirring intensity is very vigorous as the endpoint is approached. Simultaneously with the above, the same procedure is followed for a blank using all ingredients except the sample resole. The free formaldehyde of the sample is then calculated as follows:

$$\% \text{ Free Formaldehyde} = \frac{(V_1 - V_2) \times N \times 3.001}{W}$$

where
V₁=volume of 0.5 N sodium hydroxide solution used for sample titration expressed in cc.
V₂=volume of 0.5 N sodium hydroxide solution used for blank titration expressed in cc.
N=normality of sodium hydroxide solution.
W=weight of sample of resole expressed in grams.
3.001=constant factor to convert the gram equivalent weight of formaldehyde to percent.

For additional information on this procedure see Kline, G. M., "Analytical Chemistry of Polymers", High Polymers, Vol. II, Part 1, Interscience Publishers, Inc. (1959).

Water content of the resoles was measured in accordance with the method of Karl Fischer, modified to determine the endpoint of the titration electrometrically. The instrument used was an Automatic Karl Fischer Titrator, Aquatest II from Photovolt Corp. and the apparatus was assembled, filled and electrically connected in accordance with the manufacturer's instructions. An appropriate sample of the resole as suggested in the following table is weighed into a clean, dry volumetric flask. From 20-50 cc of dry pyridine or methanol is added to the flask, the flask capped and the solution mixed thoroughly until the resole sample is completely dissolved. The solution is diluted to volume with dry pyridine or methanol, the flask capped with a sleeve-type rubber stopper, and the flask shaken to mix the solution.

| Table of Estimated Sample Size | | |
|---|---|---|
| Sample Weight (grms) | Final Sample Solution (cc) | Anticipated Water (Wt %) |
| 3-4 | 50 | 0.3-5 |
| 2-3 | 100 | 5-15 |
| 1-2 | 100 | 15-25 |
| 1 | 100 | >25 |

Using an appropriate dry syringe and needle, 1 or 2 cc of the sample to be tested is drawn into the syringe and discharged into a waste container. This rinsing is repeated several times. Then the sample is drawn into the syringe until the volume is slightly beyond the desired calibration mark and then adjusted to the desired mark. The needle of the syringe is wiped clean with a tissue and the needle inserted through the sample port septum until it is under the surface of the titrating solution. The sample is then injected into the titration solution and the syringe quickly withdrawn. The automatic titration is activated and the results recorded when the titration is completed. In the same manner as described above, the water content of a blank is determined. The weight percent of water is calculated as follows:

$$\text{Water Content (wt \%)} = \frac{(C_1 - C_2)\left(\frac{V_2}{V_1}\right)}{W \times 10,000}$$

where
$C_1$=readout number indicating total μg of water in sample analyzed.
$C_2$=readout number indicating total μg of water in blank.
$V_2$=volume to which dissolved sample was diluted in cc.
$V_1$=volume of sample titrated in cc.
W=weight of sample in grams.

For additional information on this procedure see Mitchell, J. Sr., and Smith, D. M., "Aquametry", Chemical Analysis Series, Vol. 5, Interscience Publishers Inc. (1948).

The weight average molecular weight, number average molecular weight and dispersivity of the resoles were determined by Gel Permeation Chromatography. The instrument used was the Gel Permeation Chromatograph of Waters Associates, Inc. having five columns arranged in series (each column 1 foot in length) packed with Styragel. The pore sizes of the Styragel were as follows and in the following order: 1 column of 1000 Å, 2 columns of 500 Å, 2 columns of 100 Å. Detection was by differential refractive index (Waters Differential Refractometer R401). The system was operated with tetrahydrofuran (THF) as the solvent and at a flow rate of 2 mls/minute. The sample of resole weighing about 220-250 mgs was dissolved in 25 ml of THF. To avoid variations due to solvent evaporation, the solutions were transferred with minimal exposure to air and were weighed in stoppered flasks. The GPC was calibrated using monodispersed polystyrene as the standard polymer against which the resole was measured. The calibration was conducted at room temperature using THF as the solvent for the polystyrene. The results of the GPC were recorded and reduced on a recorder data processor from Waters Associates (730 Data Module) which performed all calculations and printed the final results of the analysis. For detailed information on the operation see Waters literature. See, also, Waters publication No. 82475 entitled, "GPC, Data Reduction & the 730-150 C Combination" and Waters Technical Brief No. 102, "HPLC Column Performance Rating".

Unfaced core samples were used to measure k factors by ASTM C-518 revised.

The following examples illustrate the invention. Parts and percentages are by weight unless specified otherwise.

EXAMPLE 1

A phenol formaldehyde resole having a molar ratio of formaldehyde to phenol of 2:1 was prepared in the laboratory in a 4-liter reactor equipped with a reflux condenser, a thermocouple for reading temperatures in ° C., an addition funnel, an air stirrer with double blade impeller, and means for heating (mantle) and cooling (ice bath) the reactor. First, 1434 grams of 90 percent phenol (13.73 moles) was weighed out and added to the reactor. Then 1207 grams of flake 91 percent paraformaldehyde (36.61 moles) was weighed out and added to the reactor. This phenol-formaldehyde mixture was stirred while being heated to 78° C. In the meantime, a solution of aqueous 45 percent KOH was prepared. Then 35.53 grams of the 45 percent KOH solution (0.285 moles) was added to 478.4 grams of 90 percent phenol (4.58 moles) and thoroughly mixed. This KOH-phenol mixture was then charged to the addition funnel. When the reactor temperature reached 78° C., the KOH-phenol solution was added by dropwise addition over a 150-minute period. During the addition period, the temperature in the reactor was maintained in the range of 78° C. to 80° C. by heating and/or cooling the reactor. In the early stages of addition, it was necessary to occasionally cool the reactor to control the exothermic reaction. Also during the early stages, a slight gel developed which disappeared during the addition period. Close attention to the temperature was observed when the gel was present since the heat transfer through a gel is somewhat slow.

After all of the phenol-KOH mixture was added, the reaction mixture was heated to 85° C.-88° C. and maintained at this temperature. Bubble viscosities were run at a temperature of 25° C. in a Gardner-Holdt bubble viscosity tube (ASTM D-1545-76) on samples of the reaction mixture taken every 30 minutes after the temperature reached 85° C.-88° C. When a bubble viscosity of about 15 sec. was obtained, the reaction mixture was cooled gradually ($\approx$15 min.) to a temperature of about 68° C.-79° C. When this temperature was reached, bubble viscosities were again run every 30 minutes until a bubble of about 30 sec. was obtained. The bubble viscosities were then determined every 15 minutes until a bubble of about 60 sec. was obtained. At a 60 sec. bubble viscosity, 14.57 grams of a 90 percent formic acid solution (0.285 mole) was added to the reactor and the reaction mixture cooled to 55° C. When the reaction mixture reached 55° C., 190 grams Morflex 1129 (dimethyl isophthalate) was added and allowed to dissolve. The reaction mixture was then transferred to a storage container and was stored in a refrigerator until used. The resulting resole had a Brookfield viscosity of 6,600 centipoise at 25° C. The resole contained 1.9 percent free phenol, 3.6 percent free formaldehyde, and 17.3 percent water. The resole had a weight average molecular weight of 981, a number average molecular weight of 507, and a dispersivity of 1.93.

EXAMPLE 2

A phenol formaldehyde resole was prepared on a commercial scale in a 1,000-gallon reactor equipped with a reflux condenser, a thermocouple for reading temperatures in ° C., means for accurately adding chemicals, means for agitating the mixture, and means for heating and cooling the reaction mixture.

First, 3,805.63 pounds of 90 percent phenol (16,542.3 gram moles) was charged to the reactor. Then 3,203.16 pounds of flake 91 percent paraformaldehyde (44,111.78 gram moles) was charged to the reactor with agitation. This phenol-formaldehyde mixture was stirred while being heated to 78° C. and held at this temperature for about two hours.

In the meantime, in a blend tank a solution of KOH and phenol was prepared by thoroughly mixing 1,268.55 pounds of 90 percent phenol (5,514.14 gram moles) and 94.44 pounds of 45 percent KOH solution (343.92 gram moles).

After two hours and with the reactor temperature initially at 78° C., the KOH-phenol solution was added to the reactor at a rate of 0.90-1.35 gallons per minute over a 2½ hour period. During the addition period, the temperature in the reactor was maintained in the range of 78° C.-82° C. by heating and/or cooling the reactor or temporarily stopping the addition of the phenol-KOH.

After all of the phenol-KOH mixture was added, the reaction mixture was heated to 85° C.-88° C. and maintained at this temperature. Bubble viscosities were run at a temperature of 25° C. in a Gardner-Holdt bubble viscosity tube (ASTM D-1546-76) on samples of the reaction mixture taken every 30 minutes after the temperatures reached 85° C.-88° C. When a bubble viscosity of about 15 sec. was obtained, the reaction mixture was cooled gradually to a temperature of about 68° C.-79° C. When this temperature was reached, bubble viscosities were again run every 15 minutes until a bubble of about 30 sec. was obtained. The bubble viscosities were then determined every 15 minutes until a bubble of about 60 sec. was obtained. At a 60 sec. bubble viscosity, 38.72 pounds of a 90 percent formic acid solution (343.90 gram moles) was added to the reactor and the reaction mixture cooled to 55° C. When the reaction mixture reached 55° C., 235 pounds Morflex 1129 was added and allowed to dissolve. The reaction mixture was then transferred to a storage tank and kept cool until used. The resulting resole had a Brookfield viscosity of 7,400 at 25° C. The resole contained 3.2 percent free phenol, 3.5 percent free formaldehyde, and 14.6 percent water. The resole had a weight average molecular weight of 1222, a number average molecular weight of 550, and a dispersivity of 2.22.

EXAMPLE 3

A phenol formaldehyde resole was prepared in the laboratory in a 4-liter reactor equipped with a reflux condenser, a thermocouple for reading temperatures in ° C., an addition funnel, an air stirrer with double blade impeller, and means for heating (mantle) and cooling (ice bath) the reactor. First, 2550 grams of 90 percent phenol (24.4 moles) was weighed out and added to the reactor. Then 45.6 grams of a 45% KOH solution (0.366 moles) was weighed out and added to the reactor. This phenol-catalyst mixture was agitated while being heated to 78° C. In the meantime, 1610 grams of 91% paraformaldehyde flakes (48.8 moles) was weighed out. When the reactor temperature reached 78° C., one tenth of the paraformaldehyde flake (161.0 grams) was added to the reactor. This incremental addition of paraformaldehyde was performed in a total of ten substantially equal additions staggered at 10 minute intervals. During the addition period, the temperature was maintained between about 78°-82° C.

After all of the paraformaldehyde was added, the reaction mixture was heated to 85° C.-88° C. and maintained at this temperature. Bubble viscosities were run at a temperature of 25° C. in a Gardner-Holdt bubble viscosity tube (ASTM D-1545-76) on samples of the reaction mixture taken every 30 minutes after the temperature reached 85° C.-88° C. When a bubble viscosity of about 15 sec. was obtained, the reaction mixture was cooled gradually ($\approx$15 min.) to a temperature of about 78° C. When this temperature was reached, bubble viscosities were again run every 15 minutes until a bubble of about 60 sec. was obtained. At a 60 sec. bubble viscosity, 18.7 grams of a 90 percent formic acid solution (0.366 mole) was added to the reactor and the reaction mixture cooled to 65° C. When the reaction mixture reached 65° C., 190 grams Morflex 1129 (dimethyl isophthalate) was added and allowed to dissolve. The reaction mixture was then transferred to a storage container and was stored in a refrigerator until used. The resulting resole had a Brookfield viscosity of 6,000 centipoise at 25° C. The resole contained 2.3 percent free phenol, 3.4 percent free formaldehyde, and 17.5 percent water. The resole had a weight average molecular weight of 902, a number average molecular weight of 448, and a dispersivity of 2.01.

EXAMPLE 4

A phenol fonmaldehyde resole was prepared on a commercial scale in a 6,000-gallon reactor equipped with a reflux condenser, a thermocouple for reading temperatures in ° C., means for accurately adding chemicals, means for agitating the mixture, and means for heating and cooling the reaction mixture.

First, 30,325 pounds of 90 percent phenol (131,700.8 gram moles) was charged to the reactor. Then 565 pounds of 45% KOH solution (2055.8 gram moles) was charged to the reactor with agitation. This mixture was stirred while being heated to 78° C.

In the meantime, 19,183 pounds of 91% paraformaldehyde flake (263,942.7 gram moles) was weighed out.

When the reactor temperature reached 78° C, the paraformaldehyde flake was metered into the reactor at a substantially even rate over a period of three hours. During the addition period, the temperature in the reactor was maintained in the range of 78°-82° C.

After all of the paraformaldehyde was added, the reaction mixture was heated to 85° C.-88° C. and maintained at this temperature. Bubble viscosities were run at a temperature of 25° C. in a Gardner-Holdt bubble viscosity tube (ASTM D-1546-76) on samples of the reaction mixture taken every 30 minutes after the temperature reached 85° C.-88° C. When a bubble viscosity of about 15 sec. was obtained, the reaction mixture was cooled to a temperature of about 78° C. When this temperature was reached, bubble viscosities were again run every 15 minutes until a bubble of about 45 sec. was obtained. Then the temperature was cooled to 68°-70° C. and the bubble viscosities were then determined every 15 minutes until a bubble of about 60 sec. was obtained. At a 60 sec. bubble viscosity, 209 pounds of a 90 percent formic acid solution (1854.8 gram moles) was added to the reactor and the reaction mixture cooled to 55° C. While cooling the reaction mixture to 55° C., 2114 pounds Morflex 1129 was added and allowed to dissolve. The reaction mixture was then transferred to a storage tank and kept cool until used. The resulting resole had a Brookfield viscosity of 8,700 at 25° C. The resole contained 3.7 percent free phenol, 2.92 percent free formaldehyde, and 15.6 percent water. The resole had a weight average molecular weight of 1480, a number average molecular weight of 582, and a dispersivity of 2.55.

EXAMPLE 5

A phenolic foam was prepared in the laboratory using the laboratory mold illustrated in FIGS. 1A and 1B. The mold was made with ½-inch thick aluminum bars for the sides and ¼-inch thick aluminum plates for the top and bottom and had inside dimensions of 9⅜"×13"×2". The dimensions of the mold may be modified, for example, by substituting 1.5" or 3" wide bars for the 2" sides.

The mold was coated with a mold release agent and preheated in a 150° F. oven. A piece of dry corrugated cardboard of about 9⅜" by 28" was dried in a 150° oven for about 10-15 minutes. While the mold and cardboard were in the oven, the phenolic resin foamable composition was prepared as follows. First, 10 parts (33.2 grams) of a 50/50 by weight blend of Freon 11/Freon 113 (trichloromonofluoromethane/1,1,2-trichloro-1,2,2-trifluoroethane) fluorocarbon blowing agent was premixed with a high speed air mixer (3000 rpm) with 1 part (3.3 grams) of a silicone surfactant (Union Carbide L7003). This fluorocarbon blowing agent mixture was put in an ice bath and cooled to 50°-66° F. Then 76.6 parts (254.3 grams) of an aqueous phenolic resole prepared as in Example 1 was mixed with the high speed air mixer with 2.4 parts (8.0 grams) of silicone surfactant L-7003. The fluorocarbon blowing agent/surfactant premix was then mixed with the phenolic resole/surfactant premix. This mixture of phenolic resole, blowing agent and surfactant was cooled in the ice bath to 50°-55° F. Then 10 parts (33.2 grams) of an anhydrous toluene sulfonic/xylene sulfonic acid mixture (ULTRA-TX acid from WITCO Chemical) was weighed into a syringe and cooled to 40°-45° F. The cardboard and mold were removed from the oven. The anhydrous aryl sulfonic acid catalyst was then mixed with the phenolic resole, blowing agent and surfactant mixture at high rpm for 10-15 seconds. Then 210 grams of the final phenolic resole formable composition was immediately poured onto the cardboard in s-shaped fashion as shown in FIG. 1B. The cardboard was folded over the top of the foamable mixture and immediately put into the mold. The mold was closed and all clamps put in place and tightened. The mold with the foamable composition was placed in a 150° F. oven for 4 minutes. After removing the mold from the oven, the foam was removed and weighed. The foam was allowed to stand for 24 hours before cutting samples for evaluation of foam properties.

Figure 6:
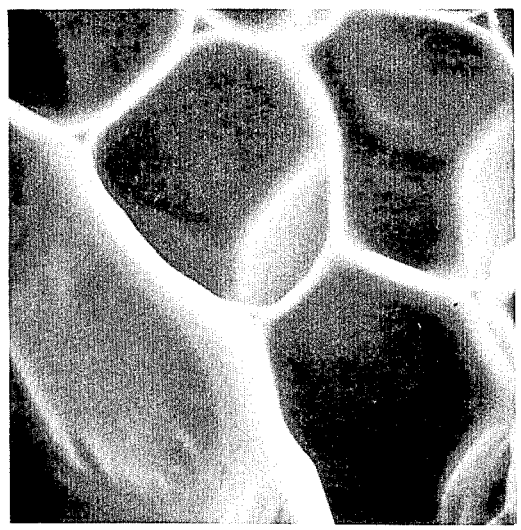
FIGS. 6-33 are scanning electron photomicrographs (SEM) showing the cells and cell walls of phenolic foams that were made using acid curing catalysts that are representative of the present invention and that were made using catalysts that are illustrative of the present invention. All SEM's are of 400X magnification, unless otherwise stated.

The cured foam contained 100 percent closed cells as measured using an air pyconometer according to test ASTM D-2856-70 and had a density of about 3.25 pounds per cubic foot (52 kg/cu. meter). The foam had an initial k factor of 0.135 before equilibration. The SEM of this foam is shown in FIG. 6. The SEM shows that the cell walls of the foam are substantially free of perforations and ruptures.

The k factors of the foam upon aging are set forth in Table I and also illustrate that the phenolic foam is substantially free of both perforations and ruptures in the cell walls.

TABLE I

| Aging Period | k Factor |
|---|---|
| 10 days | 0.123 |
| 30 days | 0.122 |
| 90 days | 0.113 |
| 120 days | 0.113 |
| 280 days | 0.118 |

A phenolic resole feed was prepared by mixing 74.6 parts of the phenolic resole prepared as in Example 2 with 2.4 parts of L-7003 silicone surfactant.

A catalyst of anhydrous toluene sulfonic acid/xylene sulfonic acid (ULTRA-TX catalyst from WITCO Chemical) was used.

The phenolic resole feed composition, catalyst and a fluorocarbon blowing agent feed containing 6 parts of 1,1,2-trichloro-1,2,2-trifluoroethane, 6 parts of trichloromonofluoromethane and 1 part of L-7003 silicone surfactant were separately fed to and mixed in a distribution device of a phenolic foam machine as illustrated schematically in FIG. 2.

The phenolic resole feed composition, catalyst, and blowing agent feed composition were kept at temperatures in the ranges, respectively, of 9.4° C. to 12.2° C., 0.5° C. to 2.8° C., and −3° C. to 1.1° C. prior to mixing in the distribution device.

The foamable composition was applied at a temperature of about 30° C. continuously for six hours to a lower facing sheet of aluminum coated cardboard moved by the lower conveyor. An upper facing sheet of the same material and side papers of polyethylene coated kraft were fed to the machine just ahead of the curing cavity as illustrated in FIGS. 2 and 3.

The relative amounts of resole feed, catalyst, and blowing agent feed in the foamable composition were determined at eight times during the total six hours and are as reported in the following table.

TABLE II

| Time Number | Total Time Elapsed | Parts Resole Feed | Parts Catalyst | Parts Blowing Agent Feed |
|---|---|---|---|---|
| 1. | 15 mins. | 76 | 12.8 | 11.2 |
| 2. | 45 mins. | 76 | 13.0 | 11.0 |
| 3. | 61 mins. | 76 | 13.0 | 11.0 |
| 4. | 101 mins. | 76 | 13.8 | 10.2 |
| 5. | 170 mins. | 76 | 13.6 | 10.4 |
| 6. | 255 mins. | 76 | 13.8 | 10.2 |
| 7. | 315 mins. | 76 | 13.8 | 10.2 |
| 8. | 360 mins. | 76 | 13.8 | 10.2 |

The foamable composition was applied to the lower facing material and the conveyor speed adjusted such that once the foam had expanded to substantially fill the curing cavity, further expansion was prevented and pressure was generated within the curing cavity.

Figure 7:
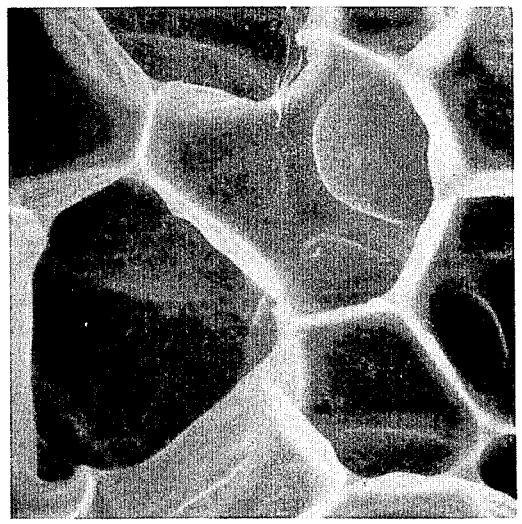

Product foam samples were taken every hour. The initial k factors, k factors after aging, and core densities of the foam samples are shown in the following Table III. FIG. 7 is a scanning electron photomicrograph of the phenolic foam prepared in this example. The SEM clearly shows that the cell walls are substantially free of perforations and ruptures and this is further illustrated by the data in Table III.

TABLE III

| Sample No. | Initial "k" | After 45 Days "k" | Core Density (pcf) |
|---|---|---|---|
| 1 | 0.161 | 0.118 | 2.642 |
| 2 | 0.158 | 0.114 | 2.593 |
| 3 | 0.164 | 0.115 | 2.814 |
| 4 | 0.160 | 0.114 | 2.62 |
| 5 | 0.171 | 0.115 | 2.87 |
| 6 | 0.168 | 0.121 | 2.76 |

Sample number one was tested after a period of one year and was found to still have a k factor of 0.118.

EXAMPLE 7

A phenolic foam was prepared in the laboratory in a pint-size tin can as follows.

Figure 8:
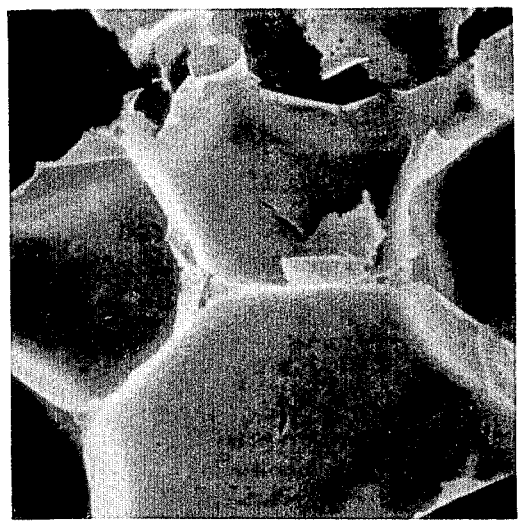

First, 10 parts (33.2 grams) of a 50/50 by weight blend of Freon 11/Freon 113 (trichloromonofluoromethane/1,1,2-trichloro-1,2,2-trifluoroethane) fluorocarbon blowing agent was premixed with a high speed air mixer (3000 rpm) with 1 part (3.3 grams) of a silicone surfactant (Union Carbide L-7003). This fluorocarbon blowing agent mixture was put in an ice bath and cooled to 50° F.-55° F. Then 221 grams of an aqueous phenolic resole prepared as in Example 1 was mixed with the high speed air mixer with 2.4 parts (8.0 grams) of silicone surfactant L-7003 in the tin can. The fluorocarbon blowing agent/surfactant premix was then mixed with the phenolic resole/surfactant premix. This mixture of phenolic resole, blowing agent and surfactant was cooled in the ice bath to 50° F.-55° F. Then 66 grams of a catalyst mixture of phenol sulfonic acid and methane sulfonic acid in a weight rato of 5/3 containing 33 percent by weight water was weighed into a beaker and cooled to 40° F.-45° F. The acid catalyst was then mixed into the can with the phenolic resole, blowing agent and surfactant mixture at high rpm for 10-15 seconds. The can with the foamable composition was placed in a 150° F. oven for four minutes. After removing from the oven, the foam was allowed to stand for 24 hours before cutting samples for evaluation of foam properties. The foam of this example is shown in FIG. 8.

The SEM clearly shows that the cell walls contain many perforations. In addition, the SEM clearly shows the desirability of preparing the phenolic foam in a substantially closed mold capable of withstanding the pressure exerted by the foaming composition since the cell walls of foam are ruptured. The initial k factor of this foam was about 0.22, which also shows that the cell walls are ruptured and/or contain perforations since no fluorocarbon agent was retained in the foam.

EXAMPLE 8

A phenolic foam was prepared in the laboratory using the laboratory mold illustrated in FIGS. 1A and 1B. The mold was made with ½-inch thick aluminum bars for the sides and ¼-inch thick aluminum plates for the top and bottom and had inside dimensions of $9\frac{3}{8}'' \times 13'' \times 2''$. The phenolic resole used in this example was a commercially available phenolic resole from Georgia Pacific sold as GP-X-2014/94S. This resole as received had 7 percent by weight water. An additional 5 percent by weight water was added to give the resole a water content of 12 percent by weight. This resin had a weight average molecular weight of 674, a number average molecular weight of 398.5 and a dispersivity of 1.69.

Figure 9:
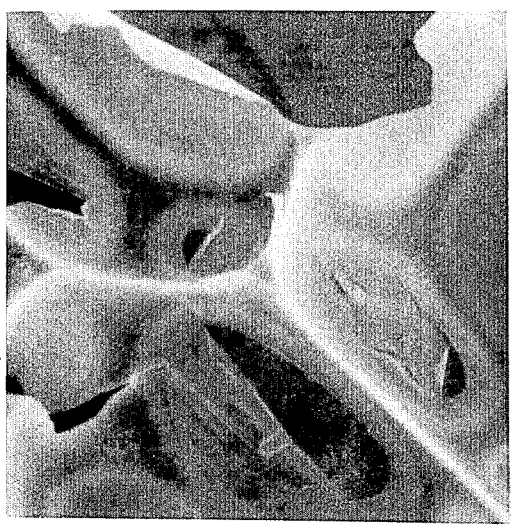

The mold was coated with a mold release agent and preheated in a 150° F. oven. A piece of dry corrugated cardboard of about $9\frac{3}{8}''$ by 28" was dried in a 150° F. oven for about 10-15 minutes. While the mold and cardboard were in the oven, the phenolic resin foamable composition was prepared as follows. First, 10 parts (33.2 grams) of a 50/50 by weight blend of Freon 11/Freon 113 (trichloromonofluoromethane/1,1,2-trichloro-1,2,2-trifluoro-ethane) fluorocarbon blowing agent was premixed with a high speed air mixer (3000 rpm) with 1 part (3.3 grams) of a silicone surfactant (Union Carbide L-7003). This fluorocarbon blowing agent mixture was put in an ice bath and cooled to 50° F.-55° F. Then 76.6 parts (254.3 grams) of the phenolic resole was mixed with the high speed air mixer with 2.4 parts (8.0 grams) of silicone surfactant L-7003. The fluorocarbon blowing agent/surfactant premix was then mixed with the phenolic resole/surfactant premix. This mixture of phenolic resole, blowing agent and surfactant was cooled in the ice bath to 50° F.-55° F. Then 10 parts of an anhydrous toluene sulfonic/xylene sulfonic acid mixture (ULTRA-TX acid from WITCO Chemical) was weighed into a syringe and cooled to 40° F.-45° F. The cardboard and mold were removed from the oven. The anhydrous aryl sulfonic acid catalyst was then mixed with the phenolic resole, blowing agent and surfactant mixture at high rpm for 10-15 seconds. Then 210 grams of the final phenolic resole foamable composition was immediately poured onto the cardboard in s-shaped fashion as shown in FIG. 1B. The cardboard was folded over the top of the foamable mixture and immediately put into the mold. The mold was closed and all clamps put in place and tightened. The mold with the foamable composition was placed in a 150° F. oven for four minutes. After removing from the oven, the foam was removed from the mold and weighed. The foam was allowed to stand for 24 hours before cutting samples for evaluation of foam properties. This foam had a k factor of 0.22. The scanning electron photomicrograph of this phenolic foam is shown in FIG. 9. The SEM shows that the foam has cell walls which are substantially free of perforations. However, the SEM also shows that many of the cell walls are ruptured or are very thin with cracks. This example illustrates the desirability of using the preferred resoles having higher molecular weights and also illustrates that the perforations in the cell walls can be eliminated even with lower molecular weight phenolic resoles.

EXAMPLE 9

A phenolic foam was prepared in the laboratory using the laboratory mold illustrated in FIGS. 1A and 1B. The mold was made with ½-inch thick aluminum bars for the sides and ¼-inch thick aluminum plates for the top and bottom and had inside dimensions of 9⅜"×13"×2".

The mold was coated with a mold release agent and preheated in a 50° F. oven. A piece of dry corrugated cardboard of about 9⅜" by 28" was dried in a 150° oven for about 10–15 minutes. While the mold and cardboard were in the oven, the phenolic resin foamable composition was prepared as follows. First, 10 parts (33.2 grams) of a 50/50 by weight blend of Freon 11/Freon 113 (trichloromonofluoromethane/1,1,2-trichloro-1,2,2-trifluoroethane) fluorocarbon blowing agent was premixed with a high speed air mixer (3000 rpm) with 1 part (3.3 grams) of a silicone surfactant (Union Carbide L-5340). This fluorocarbon blowing agent mixture was put in an ice bath and cooled to 50°–66° F. Then 69.6 parts (231.1 grams) of a phenolic resole prepared as in Example 4 was mixed wth the high speed air mixer with 2.4 parts (8.0 grams) of silicone surfactant L-5340 and 3 parts (10 grams) of urea. The fluorocarbon blowing agent/surfactant premix was then mixed with the phenolic resole/surfactant premix. This mixture of phenolic resole, blowing agent and surfactant was cooled in the ice bath to 50°–55° F. Then 14 parts (46.4 grams) of liquid anhydrous ethylbenzene sulfonic acid was weighed into a syringe and cooled to 40°–45° F. The cardboard and mold were removed from the oven. The anhydrous ethylbenzene sulfonic acid catalyst was then mixed with the phenolic resole, blowing agent and surfactant mixture at high rpm for 10–15 seconds. Then 210 grams of the final phenolic resole foamable composition was immediately poured onto the cardboard in s-shaped fashion as shown in FIG. 1B. The cardboard was folded over the top of the foamable mixture and immediately put into the mold. The mold was closed and all clamps put in place and tightened. The mold with the foamable composition was placed in a 150° F. oven for 4 minutes. After removing from the oven, the foam was removed from the mold and weighed. The foam was allowed to stand for 24 hours before cutting samples for evaluation of foam properties.

Figure 10:
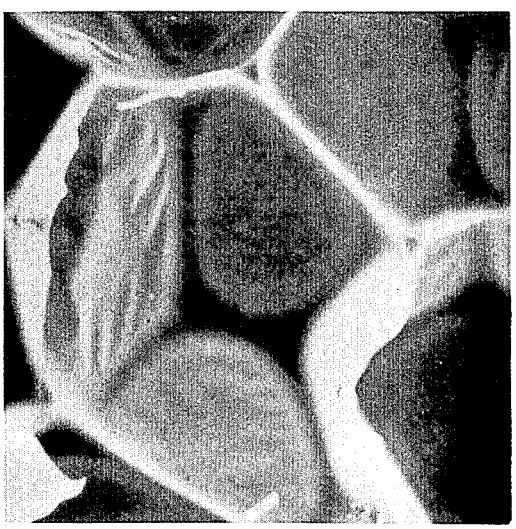

The cured foam contained 100 percent closed cells as measured using an air pyconometer according to test ASTM D-2856-70 and had a density of about 3.25 pounds per cubic foot (52 kg/cu. meter). The foam has an initial k factor of 0.12 and a k factor after 80 days of 0.115. The SEM of this foam is shown in FIG. 10. The SEM shows that the cell walls are substantially free of both perforations and ruptures which is also borne out by the k factor data.

EXAMPLE 10

A phenolic foam was prepared in the laboratory using the laboratory mold illustrated in FIGS. 1A and 1B. The mold was made with ½-inch thick aluminum bars for the sides and ¼-inch thick aluminum plates for the top and bottom and had inside dimensions of 9⅜"×13"×2".

The mold was coated with a mold release agent and preheated in a 150° F. oven. A piece of dry corrugated cardboard of about 9⅜" by 28" was dried in a 150° F. oven for about 10–15 minutes. While the mold and cardboard were in the oven, the phenolic resin foamable composition was prepared as follows. First, 10 parts (33.2 grams) of a 50/50 by weight blend of Freon 11/Freon 113 (trichloromonofluoromethane/1,1,2-trichloro-1,2,2-trifluoroethane) fluorocarbon blowing agent was prenixed with a high speed air mixer (3000 rpm) with 1 part (3.3 grams) of a silicone surfactant (Union Carbide L-5340). This fluorocarbon blowing agent mixture was put in an ice bath and cooled to 50°–66° F. Then 71.6 parts (237.8 grams) of a phenolic resole prepared as in Example 4 was mixed with the high speed air mixer with 2.4 parts (8.0 grams) of silicone surfactant L-5340 and 3 parts (10 grams) of urea. The fluorocarbon blowing agent/surfactant premix was then mixed with the phenolic resole/surfactant premix. This mixture of phenolic resole, blowing agent and surfactant was cooled in the ice bath to 50°–55° F. Then 12 parts (39.8 grams) of anhydrous liquid cumene sulfonic acid was weighed into a syringe and cooled to 40°–45° F. The cardboard and mold were removed from the oven. The anhydrous cumene sulfonic catalyst was then mixed with the phenolic resole, blowing agent and surfactant mixture at high rpm for 10-15 seconds. Then 210 grams of the final phenolic resole foamable composition was immediately poured onto the cardboard in s-shaped fashion as shown in FIG. 1B. The cardboard was folded over the top of the foamable mixture and immediately put into the mold. The mold was closed and all clamps put in place and tightened. The mold with the foamable composition was placed in a 150° F. oven for 4 minutes. After removing from the oven, the foam was removed from the mold and weighed. The foam was allowed to stand for 24 hours before cutting samples for evaluation of foam properties.

Figure 11:
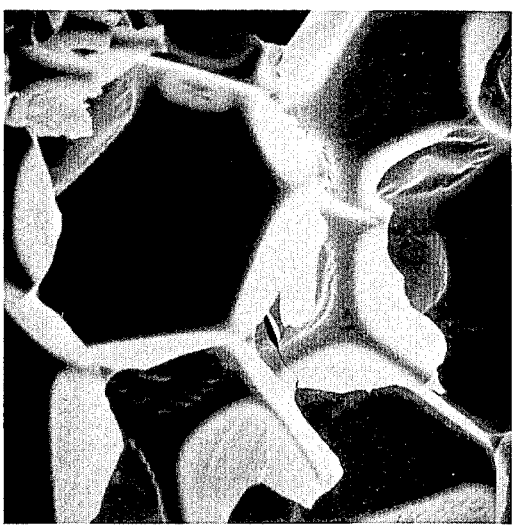

The cured foan contained 100 percent closed cells as measured using an air pyconometer according to test ASTM D-2856-70 and had a density of about 3.25 pounds per cubic foot (52 kg/cu. meter). The foam had an initial k factor of 0.156 and a k factor after 10 days of 0.145. The SEM of this foam is shown in FIG. 11 and shows that the cell walls are free of perforations and ruptures.

EXAMPLE 11

A phenolic foam was prepared in accordance with the procedures set forth in Example 10 except liquid anhydrous xylene sulfonic acid was used.

Figure 12:
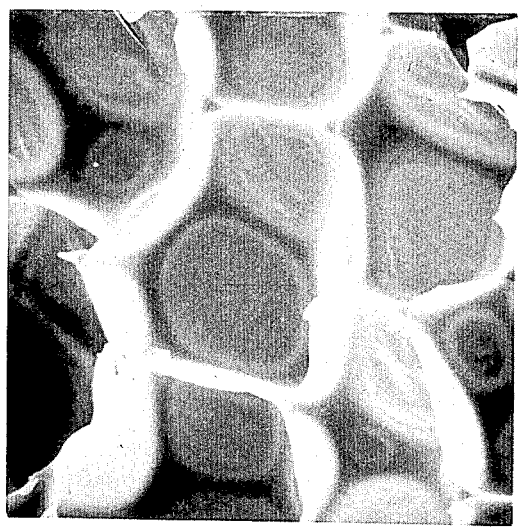

The SEM of this foam is shown in FIG. 12 and clearly illustrates that the cell walls are substantially free of perforations and ruptures.

EXAMPLE 12

A phenolic foam was prepared in accordance with the procedure set forth in Example 10 except liquid anhydrous diethylbenzene sulfonic acid was used.

Figure 13:
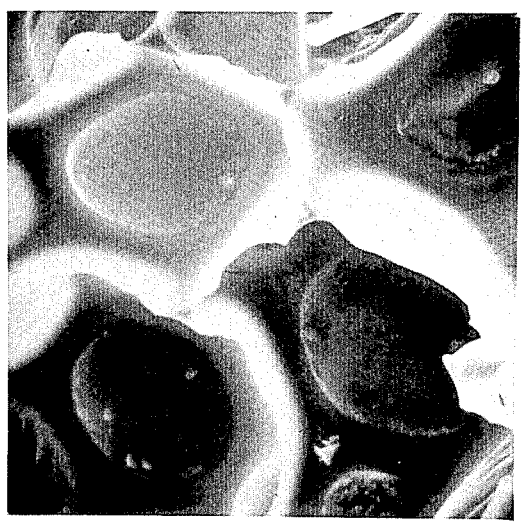

The SEM of this foam is shown in FIG. 13 and clearly shows that the cell walls are substantially free of perforations and ruptures. The foam had an initial k factor of 0.144, a k factor after 90 days of 0.121, and a k factor after 120 days of 0.125.

EXAMPLE 13

A phenolic foam was prepared in accordance with the procedure set forth in Example 10 except liquid anhydrous tetralin sulfonic acid was used.

Figure 14:
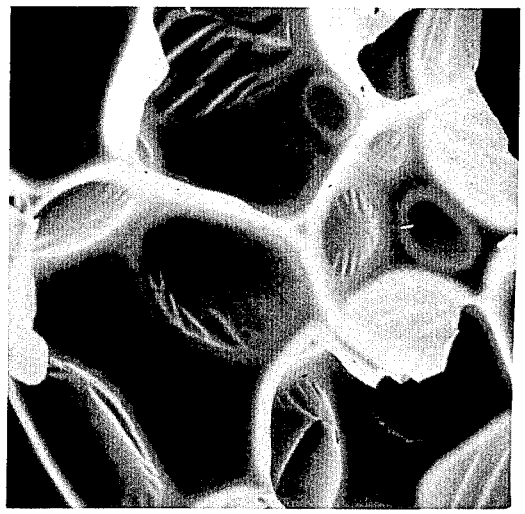

The SEM of this foam is shown in FIG. 14 and clearly shows that the cell walls are substantially free of perforations.

EXAMPLE 14

A phenolic foam was prepared in accordance wth the procedure set forth in Example 10 except that 70.6 parts (234.6 grams) of the resin was used and 13 parts (43.1 grams) of an anhydrous toluene sulfonic/xylene sulfonic mixture (65/35 wt. percent) was used.

Figure 15:
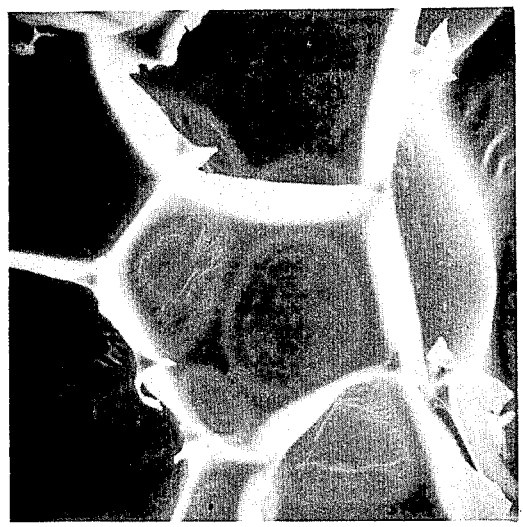

The SEM of this foam is shown in FIG. 15 and clearly shows that the cell walls are substantially free of both perforations and ruptures. The foam had an initial k factor of 0.14 and an aged k factor in accordance with the following table.

| Aging Period | k Factor |
|---|---|
| 10 days | 0.117 |
| 30 days | 0.117 |
| 60 days | 0.118 |
| 90 days | 0.114 |
| 150 days | 0.117 |

Examples 9–14 illustrate that different anhydrous aryl sulfonic acids are useful in the subject invention including an anhydrous substituted naphthalene sulfonic acid.

EXAMPLE 15

A phenolic foam was prepared in accordance with the procedure set forth in Example 10 except that 69.6 parts (231.2 grams) of the resole was used and 14 parts calculated (46.4 grams) on anhydrous basis of a catalyst that was a toluene sulfonic/xylene sulfonic acid containing 10 percent by weight water. The weight ratio of toluene to xylene sulfonic acid was 65/35.

Figure 16:
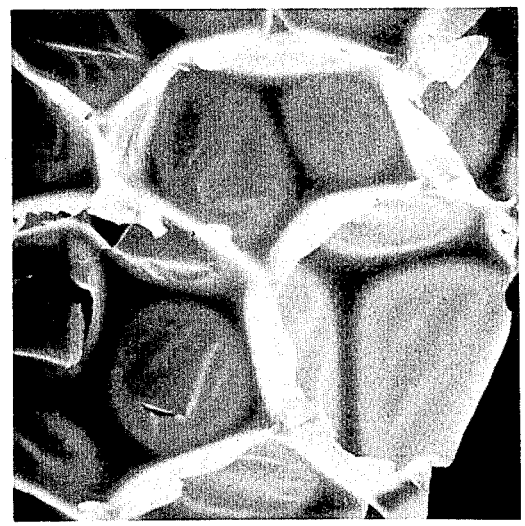
Figure 17:
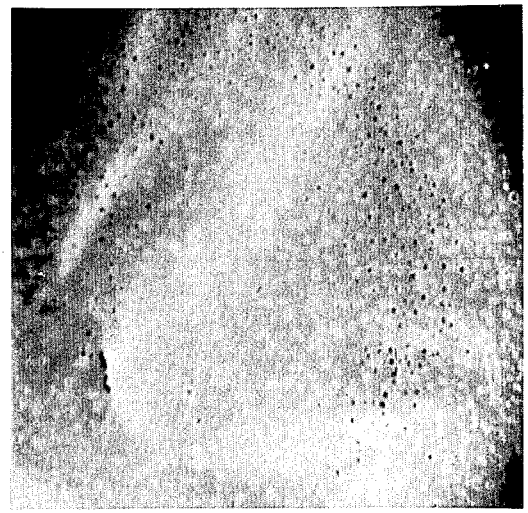

The SEMs of this foam are shown as FIGS. 16 and 17. FIG. 16 shows that the cell walls of the foam contain perforations and ruptures. The magnitude of the number of perforations is shown by FIG. 17 which has a magnification of 2000X. The foam had an initial k factor of 0.22. This example illustrates the effect of water in the catalyst. Even the preferred catalyst will not prevent perforations and ruptures when the catalyst contains this much water. The SEMs also show how water in the catalyst tends to cause ruptured cells and cracks in the cell walls.

EXAMPLE 16

A phenolic foam was prepared in accordance with the procedure set forth in Example 15 except that the toluene sulfonic/xylene sulfonic acid mixture contained only 5 percent by weight water.

Figure 18:
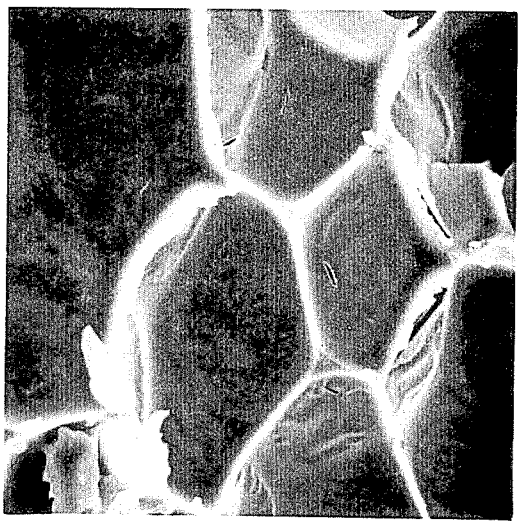

The SEM of this foam is shown as FIG. 18. FIG. 18 shows that the cell walls are substantially free of perforations. However, the cell walls are ruptured. Accordingly, the preferred catalyst will substantially reduce perforations if it contains 5 percent water but the water still adversely affects the foam. This foam had a k factor of 0.22.

EXAMPLE 17

A phenolic foam was prepared in accordance with the procedure set forth in Example 15 except that the toluene sulfonic/xylene sulfonic acid mixture contained only 2 percent by weight water.

Figure 19:
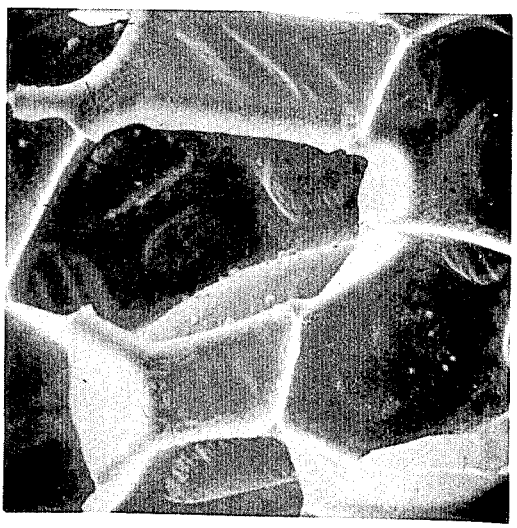

The SEM of this foam is shown as FIG. 19 and clearly shows that the cell walls are not only free of perforations but also are free from ruptured or cracked cell walls. This foam had a k factor of 0.120.

EXAMPLE 18

A phenolic foam was prepared in accordance with the general procedure set forth in Example 10 except that 59.6 parts (197.9 grams) of the resole was used and 24 parts (79.6 grams) of the catalyst was used. The catalyst was toluene sulfonic acid monohydrate and was a solid.

Figure 20:
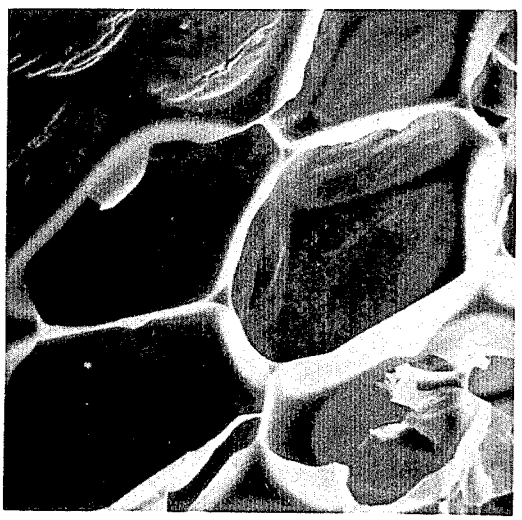

The SEM of this foam is shown as FIG. 20 and illustrates that the monohydrate will substantially eliminate the perforations from the cell walls. This example also illustrates that high quantities of the acid are necessary when the sulfonic acid is in the monohydrate form.

EXAMPLE 19

A phenolic foam was prepared in accordance with the procedure set forth in Example 5 except 80.6 parts (267.6 grams) of the resin was used and 6 parts (19.9 grams) of the catalyst was used. The catalyst was phosphorous pentoxide, which was an anhydrous solid.

Figure 21:
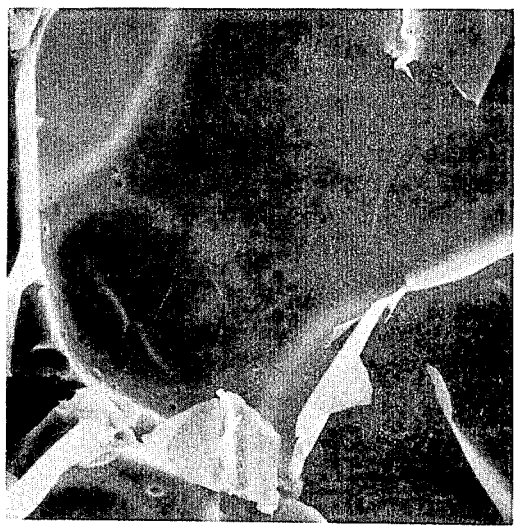

The SEM of this foam at 600X is shown as FIG. 21 which clearly indicates the presence of ruptured cell walls and large perforations in the cell walls. Even though phosphorous pentoxide is an anhydrous catalyst it will not prevent perforations or ruptures since it does not have the ability to change the compatibility of the resole with water. This foan had an initial k factor of 0.22.

EXAMPLE 20

A phenolic foam was prepared in accordance with the procedure set forth in Example 5 except the catalyst was liquid anhydrous polyphosphoric acid.

Figure 22:

The SEM of this foam at 440X is shown as FIG. 22 which clearly shows the presence of ruptures and large perforations in the cell walls. Even though the polyphosphoric acid was anhydrous, it did not prevent ruptures or perforations in the cell walls since it does not have the ability to change the compatibility of the resole with water. This foam had an initial k factor of 0.24.

EXAMPLE 21

A phenolic foam was prepared in accordance with the procedure set forth in Example 5 except 73.6 parts (244.4 grams) of resole were used and parts of catalyst were used. The catalyst was a mixture of 10 parts anhydrous polyphosphoric acid and 3 parts anhydrous methane sulfonic acid.

Figure 23:
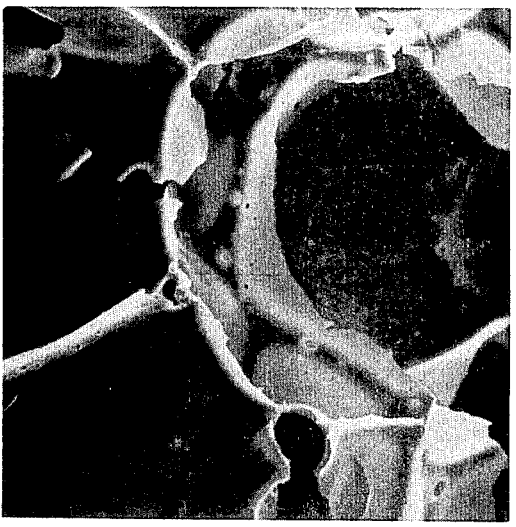

The SEM of this foam at 600X is shown as FIG. 23 which clearly shows the presence of perforations and ruptures in the cell walls. The foam had an initial k factor of 0.23.

EXAMPLE 22

A phenolic foam was prepared in accordance with the procedure set forth in Example 10 except additional water was added to the resole making the resole about 27.5 percent water. The catalyst used was the preferred 65/35 anhydrous toluene sulfonic/xylene sulfonic acid.

Figure 24:
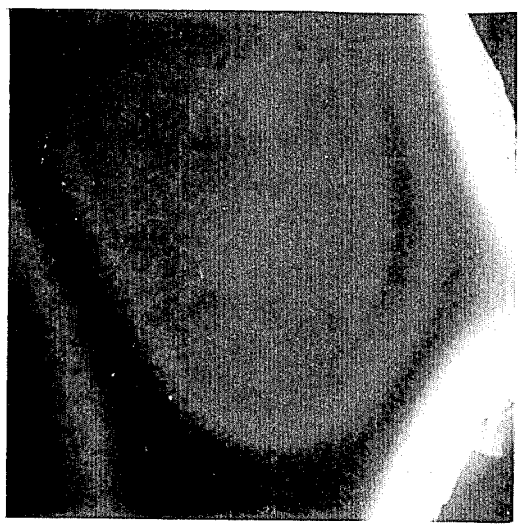

The SEM of this foam at 1000X is shown as FIG. 24 and shows that there are perforations in the cell walls. This illustrates that even the preferred catalyst will not prevent perforations when high amounts of water are present in the foamable compositions. It is believed that the perforations in this foam could be eliminated if the amount of catalyst was increased to around 18-20 parts; however, this high concentration of catalyst may cause the foaming and curing to proceed too rapidly.

EXAMPLE 23

A phenolic foam was prepared in accordance with the procedure set forth in Example 22 except that only enough additional water was added to the resole to make the resole 22.5 percent water.

Figure 25:
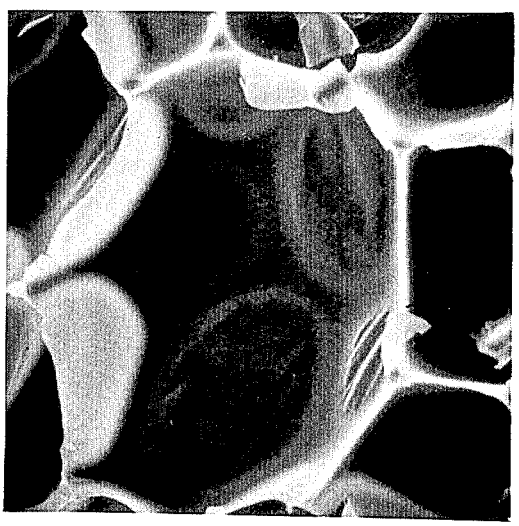

The SEM of this foam is shown as FIG. 25 and shows that the cell walls are substantially free of perforations. This shows that the preferred catalysts are effective even when the foamable composition has high concentrations of water. This foam had an initial k factor of 0.22.

EXAMPLE 24

A phenolic foan was prepared in accordance with the procedure set forth in Example 22 except water was vacuum stripped from the resole at room temperature until the resole was 12 percent by weight water.

Figure 26:
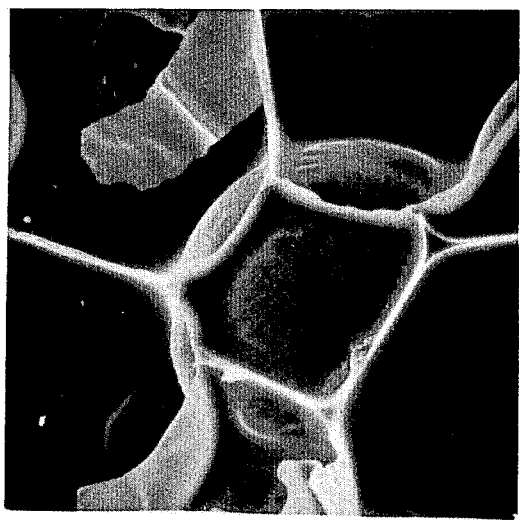

The SEM of this foam is shown as FIG. 26 and shows that the cell walls are free of perforations and ruptures. The foam had an initial k factor of 0.142 and a k factor after 90 days of 0.144.

EXAMPLE 25

A phenolic resole was prepared in the laboratory in accordance with Example 3 except the reaction was stopped and cooled and the formic acid added when the bubble viscosity was 10 seconds. This resole had 14.0 percent water, 4.0 percent formaldehyde and 4.1 percent phenol. This resole had a weight average molecular weight of 519, a number average molecular weight of 400.5 and a dispersivity of 1.26.

A foam was prepared from this resole following the procedures set forth in Example 10 except the catalyst was the preferred 65/35 anhydrous toluene sulfonic/xylene sulfonic acid mixture.

Figure 27:
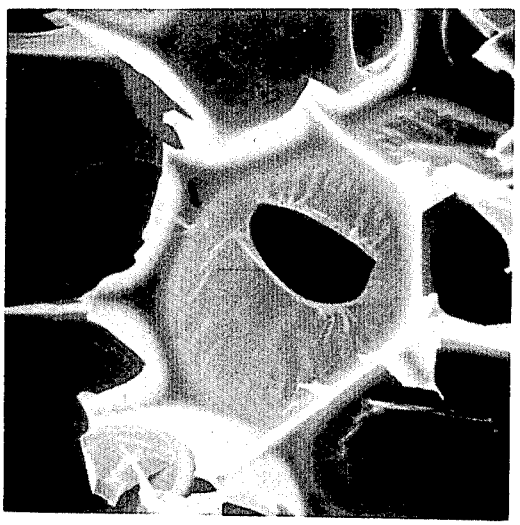

The SEM of this foam is shown as FIG. 27. The SEM shows that the cell walls are substantially free of perforations. The SEM also shows that some of the cell walls are ruptured and some are thin and cracked. This shows the desirability of using resoles having the preferred molecular weight characteristics and also shows that the catalysts of the present invention will work on low molecular weight resoles. This foam had an initial k factor of 0.22.

EXAMPLE 26

A phenolic resole was prepared in the laboratory in accordance with Example 2 except the reaction was stopped when a bubble viscosity of 80 seconds was achieved. This resole had 15.1 percent water, 3.1 percent formaldehyde and 3.2 percent phenol. This resole had a weight average molecular weight of 1504, a number average molecular weight of 591 and a dispersivity of 2.55.

A foam was prepared from this resole following the procedures set forth in Example 10 except the catalyst was the preferred 65/35 anhydrous toluene sulfonic/xylene sulfonic acid mixtures.

Figure 28:
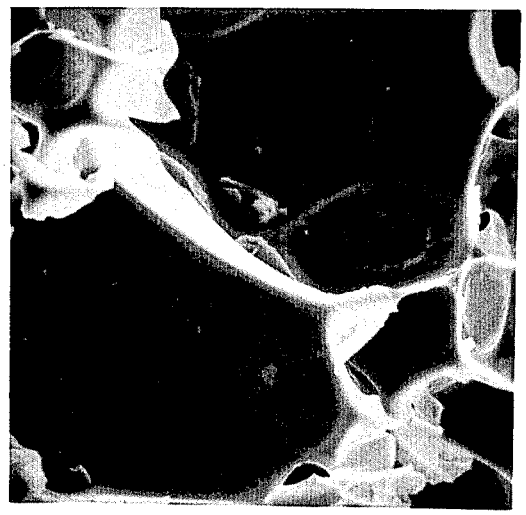

The SEM of this foam is shown as FIG. 28. The SEM shows that the cell walls are free of perforations and ruptures. This example illustrates the desirability of using the preferred resoles. This foam had an initial k factor of 0.121.

EXAMPLE 27

A phenolic foam was prepared in accordance with the procedure of Example 10 except the resole used was a resole commercially available from Bakelite under designation PS-278.

Figure 29:
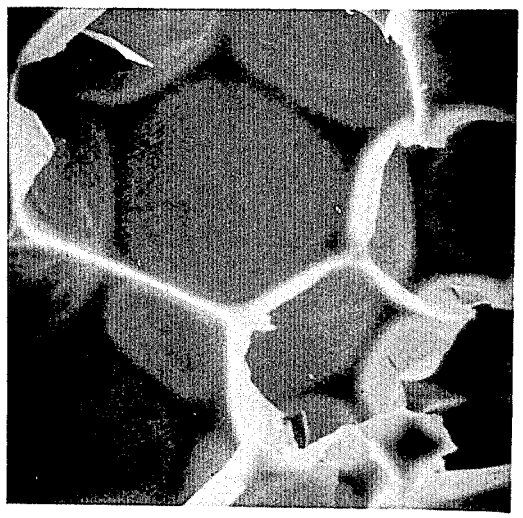

The SEM of this foam is shown as FIG. 29 and clearly shows the cell walls are free of perforations.

EXAMPLE 28

A phenolic resole was prepared in accordance with U.S. Pat. Nos. 4,176,106 and 4,176,216. The procedure followed was at column 29, line 15 for Resole No. III. This resole as prepared had 7.9% water, 7.3% formaldehyde and 5.6% phenol. The resole had a weight average molecular weight of 688, a number average molecular weight of 440 and a dispersivity of 1.56. Additional water was then added to this resole to make it 16% water.

A foam was prepared from this resole in accordance with the procedure set forth in Example 10 except the catalyst was the preferred 65/35 toluene sulfonic/xylene sulfonic acid mixture.

Figure 30:
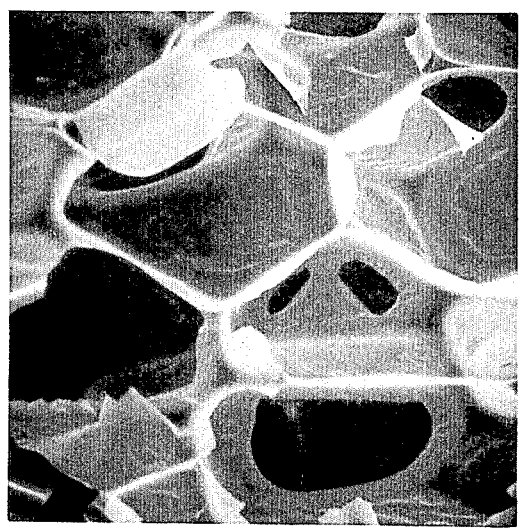

The SEM of this foam is shown as FIG. 30 and shows that the cell walls are free of perforations. The SEM also shows that many of the cell walls are ruptured. The rupturing occurred even though foaming was done in a closed mold capable of withstanding 15 psi. This illustrates that the present invention will prevent perforations even with low molecular weight resoles and also shows the desirability of using the preferred resoles.

EXAMPLE 29

A phenolic foam was prepared as in Example 15 except the catalyst was xylene sulfonic acid containing 10 percent by weight water.

Figure 31:
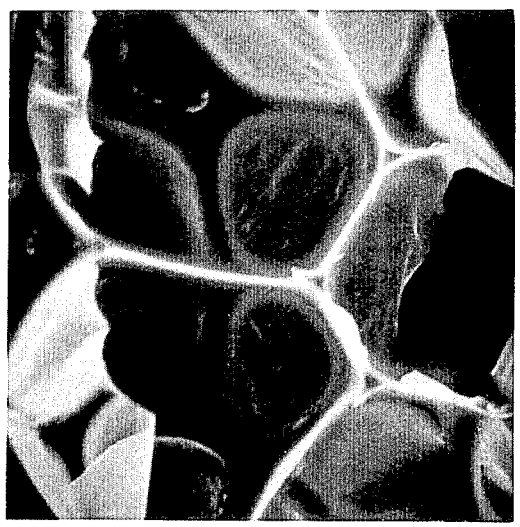

The SEM of this foam is shown as FIG. 31. FIG. 31 shows that the cell walls of the foam are free of perforations but are ruptured. This foam had an initial k factor of 0.22. This example illustrates that even though water can be tolerated in this catalyst at concentrations around 10 percent for preventing perforations, these high levels will not prevent water from rupturing the cell walls.

EXAMPLE 30

A phenolic foam was prepared in accordance with Example 7 except the resole was prepared in accordance with Example 4 and the ratio of ingredients was as in Example 10.

Figure 32:
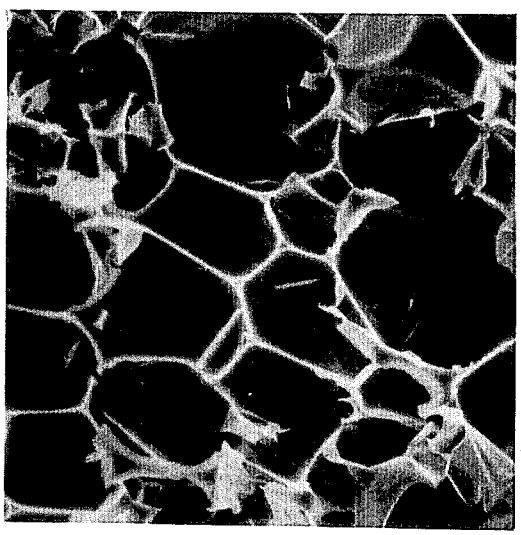
Figure 33:

The SEM of this foam at 200X is shown as FIG. 32 and at 400X is shown as FIG. 33. FIGS. 32 and 33 show that the cell walls are ruptured. This example shows the necessity of having a substantially closed mold in order to prevent most of the cell walls from being ruptured. A comparison of this SEM with the other SEMs, particularly FIG. 18 and FIG. 31, shows the difference in rupturing caused by lack of pressure and rupturing caused by water.

We claim:

1. A process for preparing phenolic foam having cell walls substantially free of perforations and ruptures caused by water comprising foaming and curing a foamable phenolic resole composition of the type comprising an aqueous phenolic resole, blowing agent, surfactant, and acid curing catalyst wherein the foamable phenolic resole composition contains at least about 5 percent by weight water and wherein the acid curing catalyst is an anhydrous aryl sulfonic acid that has a pKa less than about 2.0 and that reduces the compatibility of the aqueous phenolic resole with water sufficiently enough to prevent perforations and ruptures in the cell walls of the phenolic foam caused by water and wherein the anhydrous aryl sulfonic acid is used as a liquid in an amount sufficient to prevent perforations and ruptures in the cell walls of the foam caused by water said amount being at least 6 percent by weight of the foamable phenolic resole composition.

2. A process as in claim 1 wherein the anhydrous aryl sulfonic acid is selected from benzene sulfonic acid, toluene sulfonic acid, xylene sulfonic acid and mixtures thereof.

3. A process as in claim 1 wherein the anhydrous aryl sulfonic acid is a mixture of from 50 to 90 weight percent toluene sulfonic acid and from 10 to 50 weight percent xylene sulfonic acid.

4. A process as in claims 2 or 3 wherein the anhydrous aryl sulfonic acid contains less than about 3.0 percent by weight water.

5. A process as in claim 1 wherein the amount of anhydrous aryl sulfonic acid is from about 12 to 16 percent by weight of the foamable phenolic resole composition.

6. A process as in claims 2 or 3 wherein the amount of anhydrous aryl sulfonic acid is from about 12 to 16 percent by weight of the foamable phenolic resole composition.

7. A process for preparing phenolic foam having cell walls substantially free of perforations and ruptures caused by water comprising foaming and curing in a substantially closed mold a foamable phenolic resole composition of the type comprising an aqueous phenolic resole, blowing agent, surfactant, and acid curing catalyst wherein the foamable phenolic resole composition contains at least about 5 percent by weight water and wherein the acid curing catalyst is an anhydrous aryl sulfonic acid that has a pKa less than about 2.0 and that reduces the compatibility of the aqueous phenolic resole with water sufficiently enough to prevent perforations and ruptures in the cell walls of the phenolic foam caused by water and wherein the anhydrous aryl sulfonic acid is used as a liquid in an amount sufficient to prevent perforations and ruptures in the cell walls of the foam caused by water said amount being at least 6 percent by weight of the foamable phenolic resole composition.

8. A proess as in claim 7 wherein the anhydrous aryl sulfonic acid is selected from benzene sulfonic acid, toluene sulfonic acid, xylene sulfonic acid and mixtures thereof.

9. A process as in claim 7 wherein the anhydrous aryl sulfonic acid is a mixture of from 50 to 90 weight percent toluene sulfonic acid and from 10 to 50 weight percent xylene sulfonic acid.

10. A process as in claims 8 or 9 wherein the anydrous aryl sulfonic acid contains less than about 3.0 percent by weight water.

11. A process as in claim 7 wherein the amount of anhydrous aryl sulfonic acid is from about 12 to 16 percent by weight of the foamable resole composition.

12. A process as in claims 8 or 9 wherein the amount of anhydrous aryl sulfonic acid is from about 12 to 16 percent by weight of the foamable phenolic resole composition.

* * * * *